(12) United States Patent
Mishra

(10) Patent No.: US 6,339,587 B1
(45) Date of Patent: Jan. 15, 2002

(54) NETWORK MANAGEMENT SYSTEM

(75) Inventor: Richard Mishra, London (GB)

(73) Assignee: British Telecommunications plc, London (GB)

(*) Notice: Subject to any disclaimer, the term of this patent is extended or adjusted under 35 U.S.C. 154(b) by 0 days.

(21) Appl. No.: 09/029,617

(22) PCT Filed: Dec. 4, 1996

(86) PCT No.: PCT/GB96/02991

§ 371 Date: Mar. 5, 1998

§ 102(e) Date: Mar. 5, 1998

(87) PCT Pub. No.: WO97/23101

PCT Pub. Date: Jun. 26, 1997

(30) Foreign Application Priority Data

Dec. 15, 1995 (GB) .............................. 9525726

(51) Int. Cl.[7] .......................... H04Q 3/00; H04Q 3/66; H04L 29/08
(52) U.S. Cl. ........................ 370/255; 370/254; 370/351
(58) Field of Search ................................. 370/237, 254, 370/468, 255, 351; 379/221; 340/2.23, 2.7

(56) References Cited

U.S. PATENT DOCUMENTS

| | | | |
|---|---|---|---|
| 5,262,906 A | | 11/1993 | Mazzola |
| 5,513,171 A | * | 4/1996 | Ludwiczak .................. 370/13 |
| 5,526,414 A | * | 6/1996 | Bedard ........................ 379/221 |
| 5,590,120 A | * | 12/1996 | Vaishnavi ................... 370/254 |
| 5,936,951 A | * | 8/1999 | Andersson .................. 370/351 |

FOREIGN PATENT DOCUMENTS

| | | |
|---|---|---|
| DE | 43 08 512 A | 9/1994 |
| EP | 0 376 556 A | 7/1990 |
| EP | 0 660 569 A | 6/1995 |

OTHER PUBLICATIONS

IEEE INFOCOM '89, vol. 1, Apr. 23–27, 1989, Ottawa CA, pp. 127–135, XP000075823 Lee et al.: "An efficient near–optimal algorithm for the joint traffic and trunk routing problem in self–planning networks" see p. 127, left–hand column, line 1—p. 128, right–hand column, last line.

(List continued on next page.)

Primary Examiner—Edwin C. Holloway, III
(74) Attorney, Agent, or Firm—Nixon & Vanderhye

(57) ABSTRACT

A method of operating a network management system for a telecommunications involves satisfying a request for a connection path having a specified capacity between two specified termination of the network. The network comprises a plurality of connections between network nodes, each connection having a predetermine capacity. The method comprises first searching a store of routings and available capacities to identify a connection path to satisfy the request. Then the method determines whether a connection path with adequate capacity is present in the store. If no such path is present in the store, then the method proceeds to testing a model of the network to identify at least one suitable connection path between the requested terminations. Subsequently, the method proceeds to adding any suitable connection paths, identified to the store, and upon identifying a connection path having the requested capacity between the requested terminations, allocating the identified connections so as to satisfy the request. The described methodology does not necessarily identify the optimum solution, as such a search is not exhaustive. An exhaustive search would take a very large amount of computer time, and the result would only remain optimal until the next request for capacity is made, when the entire allocation scheme would have to be rebuilt. Instead the method identifies a good, but not necessarily perfect, solution in a reasonable time, thereby trading perfection for speed.

25 Claims, 18 Drawing Sheets

OTHER PUBLICATIONS

IEEE Communications Magazine, vol. 28, No. 10, Oct. 1990, New York US, pp. 54–64, XP000165755 key et al.: Distributed dynamic routing schemes: see p. 55, right–hand column, line 3—p. 56, right–hand column, last line.

IEEE Transactions on Reliability, vol. 40, No. 4, Oct. 1991, New York US, pp. 404–416, XP000232099 Coan et al.: Using distributed topology update and preplanned configurations to achieve trunk network survivability: see p. 405, right–hand column, line 7—p. 406, right–hand column, paragraph 1 see p. 408, left–hand column, line 11—right–hand column, line 12.

International Switching Symposium, Mar. 15–20, 1987, Phoenix US, pp. 989–993, XP002015250 Gopal et al.: "An architecture and algorithm for distributed control of resources in the public network" see p. 990, right–hand column, line 27—p. 991, left–hand column, line 12.

\* cited by examiner

Fig.2.

| VC4 | VC3 | VC2 | |
|---|---|---|---|
| | | VC2 | VC12-1 |
| | | | VC12-2 |
| | | | VC12-3 |
| | | VC2 | VC12-4 |
| | | | VC12-5 |
| | | | VC12-6 |
| | | VC2 | VC12-7 |
| | | | VC12-8 |
| | | | VC12-9 |
| | VC3 | VC2 | VC12-10 |
| | | | VC12-11 |
| | | | VC12-12 |
| | | VC2 | VC12-13 |
| | | | VC12-14 |
| | | | VC12-15 |
| | | VC2 | VC12-16 |
| | | | VC12-17 |
| | | | VC12-18 |
| | | VC2 | VC12-19 |
| | | | VC12-20 |
| | | | VC12-21 |
| | | VC2 | VC12-22 |
| | | | VC12-23 |
| | | | VC12-24 |
| | | VC2 | VC12-25 |
| | | | VC12-26 |
| | | | VC12-27 |
| | | VC2 | VC12-28 |
| | | | VC12-29 |
| | | | VC12-30 |
| | VC3 | VC2 | VC12-31 |
| | | | VC12-32 |
| | | | VC12-33 |
| | | VC2 | VC12-34 |
| | | | VC12-35 |
| | | | VC12-36 |
| | | VC2 | VC12-37 |
| | | | VC12-38 |
| | | | VC12-39 |
| | | VC2 | VC12-40 |
| | | | VC12-41 |
| | | | VC12-42 |
| | | VC2 | VC12-43 |
| | | | VC12-44 |
| | | | VC12-45 |
| | | VC2 | VC12-46 |
| | | | VC12-47 |
| | | | VC12-48 |
| | | VC2 | VC12-49 |
| | | | VC12-50 |
| | | | VC12-51 |
| | VC3 | VC2 | VC12-52 |
| | | | VC12-53 |
| | | | VC12-54 |
| | | VC2 | VC12-55 |
| | | | VC12-56 |
| | | | VC12-57 |
| | | VC2 | VC12-58 |
| | | | VC12-59 |
| | | | VC12-60 |
| | | VC2 | VC12-61 |
| | | | VC12-62 |
| | | | VC12-63 |

NETWORK MANAGEMENT SYSTEM

RELATED APPLICATIONS

This application is related to GB9525726.7 filed on Dec. 15, 1995; and PCT/GB96/02991 filed on Dec. 4, 1996.

BACKGROUND OF THE INVENTION

This invention relates to a network management system for satisfying a request for a connection path having a specified capacity between two specified terminations and to a method of operating such a system. It is particularly concerned with a network management system for a synchronous digital hierarchy (SDH) network, but has application in other types of networks as well.

A typical digital telecommunications network for transmission of voice or data operates at a sampling rate of 8000 samples/sec; (1 per 125 microseconds). Each sample is coded as an 8-bit byte, resulting in a 64 kbit/sec bit rate. This is typically multiplexed over the network in a 32-channel frame (including one channel each for synchronisation and signalling), resulting in a transmission rate of 64×32=2,048 kbits/sec, known as a 2 Mbit system. Further multiplexing can take place by multiplexing four lower level channels into one higher level channel to produce a secondary bit rate of 8 Mbits/s, and this process can be repeated to produce tertiary (34 Mbit/s), and quaternary (140 Mbit/s) bit rates. These are not exact quadruples because of the need for an additional signalling overhead to be included.

The bit rates quoted above are those used in Europe. In other regions such as the USA and Japan, although the fundamental bit rate is the same 64 kbit/s, the samples are initially multiplexed in a 24 channel frame (rather than 32) to produce a primary bit rate of 1.544 Mbit/s, a secondary bit rate of 6.312 Mbit/s, a tertiary bit rate of 32 Mbit/s (Japan) or 45 Mbit/s (USA), and a quaternary bit rate of 98 Mbit/s (Japan) or 140 Mbit/s (USA). A network which operates at these bit rates and which has multiplexers/demultiplexers for converting from one rate to another is known as a "plesiochronous—i.e. nearly synchronous—digital hierarchy": (PDH) network. A disadvantage of such a network is that at any point in the network at which different channels need to be separately routed, the signals have to be demultiplexed step-by-step back to a 64 kbit/s signal in order that the individual channels can be identified. This is necessary even if the channels are then to be immediately re-multiplexed up to one of the higher bit-rates for onward transmission.

The Synchronous Digital Hierarchy (SDH) is a standard which not only allows transmission at all the above bit rates to be carried, but allows individual signals to be added or extracted without demultiplexing other signals multiplexed with it. In an SDH link operating at 155 Mbit/s, the signal is divided into frames known as STM-1 frames. Each frame comprises 2430 bytes, 2349 of which are available as payload, the rest being for signalling and synchronisation. This corresponds to a payload bit rate of 150 Mbit/s.

Each 150 Mbit/s STM-1 frame consists of one or more 'virtual containers'. There are five types:

A VC11 has a capacity of 1.7 Mbit/s and can carry one 1.5 Mbit/s primary channel according to the US or Japanese 24×64 kbit/s standard.

A VC12 has a capacity of 2.3 Mbit/s and can carry one 2 Mbit/s primary channel according to the European 30×64 kbit/s standard.

A VC2 has a capacity of 6.8 Mbit/s and can carry one 6.3 Mbit/s channel (the US/Japanese secondary level), or four VC11's or three VC12's.

A VC3 has a capacity of 50 Mbit/s, allowing it to support any of the tertiary level PDH bit rates: 32 Mbit/s (Japan), 34 Mbit/s (Europe), or 44 Mbit/s (USA). It may instead carry seven VC2's, twenty-one VC12's or twenty-eight VC11's.

A VC4 has a capacity of 150 Mbit/s, allowing it to support the quaternary PDH bit rate of 140 Mbit/s (or 98 Mbit/s in Japan), or three VC3's, twenty-one VC2's, sixty-three VC12's or eighty-four VC11's.

Mixtures of virtual containers may also be carried: for example an STM-1 frame might consist of one VC3, nine VC2's, nine VC12's and eight VC11's. The VC3 may itself contain VC11's, VC12's or VC2's (or a mixture), and the VC2's may themselves contain VC11's or VC12's.

SDH links can operate at higher bit rates. For example, in an SDH link operating at 622 Mbit/s, the signal is divided into frames known as STM-4 frames, each of which has a payload four times greater than an STM-1 frame.

SDH networks have advantages over PDH networks. In particular, the STM-1 frame includes data regarding each individual virtual container within it, which allows the channel represented by that container to be demultiplexed and routed separately at any network node without the need to dismantle the whole frame. In contrast, in a PDH network the individual channels are not identifiable and extractable without undoing each multiplexing stage in turn down to the required level, and then remultiplexing the channels not extracted for further transmission.

In an SDH network traffic capacity can be booked in advance, on request of the user. It is then necessary to meet this request by allocating a path through the network having the required capacity. The customer may have specific requirements, for example two or more independent paths may be required, sharing no individual links or nodes, to ensure that an individual failure does not result in loss of the entire booked capacity. The path allocated to the customer may then be used in any way he requires, eg to route individual calls. It should be noted that capacity management involves different requirements to the handling of individual call traffic. In particular, capacity management has to consider future requirements for capacity, and not just the real-time requirements that a call-traffic management system has to deal with. Ideally a capacity management system should also be able to provide capacity immediately, perhaps as a premium ("Just In Time") service. Moreover, in a call traffic management system, it is normally optimal to try to spread call traffic over as many different routes as possible, to minimise interference and ensure minimum disruption if one route should fail. In capacity management, the optimum is to aggregate low capacity routes where possible, to fully load each link that is used, thereby keeping other links free. The free links can then be used if a subsequent requirement for a high-capacity link is received, without having to first re-allocate low capacity links.

The availability of connections between nodes within the network depends on a number of factors which are constantly changing. For example, equipment is taken out of service for maintenance, and re-instated afterward. This may be on a planned or emergency basis. Moreover, as capacity is allocated to one user it becomes unavailable for use by others.

In order to control the routing of transmissions through an SDH network, it is therefore necessary to allocate capacity over the network between the source and destination. Various criteria need to be addressed, such as the capacity required, the time the capacity is needed, the length of time needed, the need for robustness (addressed for example by routing part of the capacity over one path and part over another, a practice known as 'diversity', such that a connection is maintained, albeit at lower capacity, even should one path fail), and any variations in availability of capacity e.g. because of planned maintenance, or other users of the system.

In order to establish the routing to be taken by a transmission, the various connections to be used in the network need to be allocated and reserved. The capacity may be required immediately, or the capacity may be reserved in advance against an expected requirement.

It is possible to envisage a path-finding system in which a path is sought from first principles every time a new request for capacity is made, by analysing the network connectivity and its committed capacity, and calculating a path through it. For a complex network, such an exhaustive analysis would involve a large amount of processor power, and to explore all the possible connections would be very slow. Much of the processing could be redundant, since repeated requests for connection between the same two points would usually be satisfied by the same routing.

An alternative approach is to maintain a listing of all possible paths between any given starting point and any given end point. On request for capacity between such points, the optimum path having sufficient capacity (allowing for any capacity already committed or out of service), can be selected. This method is impracticable for a network of any size, because it requires a very large memory size. There are an unmanageably high number of possible paths through a complex network, and although most of these paths are sub-optimal, they may be needed if the best path stored is unavailable for any reason, such as link failure or capacity already committed. This method also requires constant updating as the network evolves, and requires routings for which capacity is already committed to be expressly considered and rejected.

SUMMARY OF THE INVENTION

According to the invention there is provided a method of operating a network management system for a telecommunications network in order to satisfy a request for a connection path having a specified capacity between two specified terminations of the network, the network comprising a plurality of connections between network nodes, each connection having a predetermined capacity, the method comprising the steps of searching a store of routings and available capacities to identify a connection path to satisfy the request; determining whether a connection path with adequate capacity is present in the store; if no such path is present in the store, testing a model of the network to identify at least one suitable connection path between the requested terminations, and adding any suitable connection paths so identified to the store, and upon identifying a connection path having the requested capacity between the requested terminations, allocating the identified connections so as to satisfy the request.

It will be noted that this method does not necessarily identify the optimum solution, as the search is not exhaustive. An exhaustive search would take a very large amount of computer time, and the result would only remain optimal until the next request for capacity is made, when the entire allocation scheme would have to be rebuilt. Instead, the method of the invention identifies a good (but not necessarily perfect) solution in a reasonable time, thereby trading perfection for speed.

In a preferred arrangement the store of routings and available capacities is updated in response to connection paths becoming available or unavailable. In this way duplication of processing is avoided, whilst the memory need only store routings which are likely to be required.

By maintaining a store of paths which have been determined, but allowing new paths to be added, the method reduces the total processing time required, whilst still allowing changes in availability to be accommodated.

In a further preferred arrangement capacity is allocated in advance, in response to a request, but the allocation of individual paths to connections is made at the time for which the path is required. In this way the utilisation of capacity can be optimised, without jeopardising the traffic which has already reserved capacity.

The path finding process may comprise the following steps:
identifying a start point and a target point;
identifying, from the nodes in the network directly connected to the start point, that node which is most appropriate for approaching the target point;
establishing the connection between the start point and the node so identified as the first link in the connection path;
repeating the process using the identified node as the new start point, until a connection is made with the target point.

Preferably, the identification of the most appropriate node takes into account the distance of the target, and the structure of the network. In a typical hierarchical structure, weighting factors can be applied to different nodes to preferentially select a node at a level in the hierarchy most appropriate for the distance to the target.

This approach does not rigorously explore all possible paths, but at each step analyses the most likely possibility. Unless the network has any very unusual features this will produce an answer close to optimum. In a typical hierarchical network comprising a plurality of levels each of which comprises a ring, the majority of nodes only have two connections, thereby simplifying the analysis process.

Whilst not rigorous, this process will find the optimum routing, or one very close to optimum, in the majority of cases provided the network is well structured. Safeguards can be included to ensure that the path selected is not unreasonable. In particular when a node is established as forming part of a connection path, said node can be excluded from consideration in any further links in the path. If all nodes connected to the current start point are excluded from consideration, (as may be the case if they already form part of the path, are currently fully committed or are out of service) the link connected to the current start node may be deleted and the process repeated from the previous start node. Preferably, at each stage any node connected either to the current start node or to any other nodes already forming part of the current connection path (other than any excluded node), can be considered as a candidate for the next link, and if a node connected to an existing node other than the current start node is selected, the links between the existing node and the current start node are deleted from the connection path and the link between the existing node and the new node is added to the connection path.

The rules may also limit the number of transitions between hierarchical levels. In particular, the rules may require that nodes at the same level may only be connected to each other by a path using nodes at the same or a higher level.

The method may be carried out starting from both end points, generating two half paths, the target point of each half path being redefined at each interaction as the current start point of the other half path. In this case the rule referred to above limiting the number of level transitions can be defined more simply as requiring that each link of each half path, starting at its respective end point, can only link to a node at the same or a higher level as the current start point.

It should be recognised that the term 'half-path' is used in this description, to mean a part of a path built up from one end. The two half-paths making up the complete path are not necessarily the same length.

In a preferred arrangement, the method may comprise the further step of monitoring the available capacity present in the store, and providing an alert if the available capacity falls below a predetermined minimum. The capacity may be monitored by determining whether the step of testing the model fails to identify a suitable connection path. This allows the system administrator to be alerted to imminent capacity shortages before they become critical.

BRIEF DESCRIPTION OF THE DRAWINGS

Embodiments of the invention will be further described by way of example with reference to the drawings, in which:

FIG. 2 is a representation of the STM-1 frame;

DETAILED DESCRIPTION OF THE INVENTION

Figure 1:
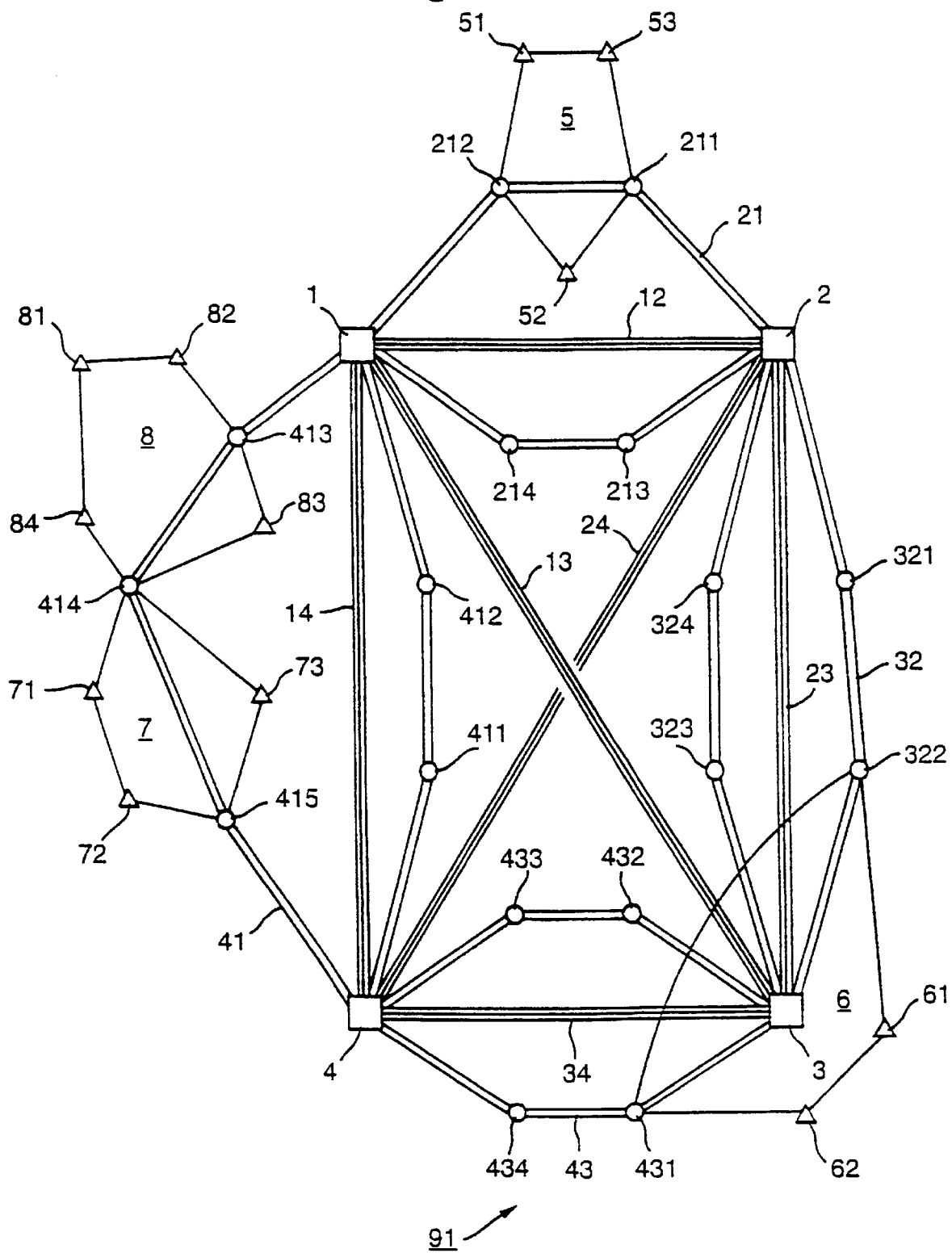
FIG. 1 is a diagrammatic representation of a tiered synchronous digital hierarchy network.

FIG. 1 shows in diagrammatic form a very simple 3-tier SDH network 91. In the highest tier of the network there are four nodes, represented by squares, 1, 2, 3, 4, which are fully interlinked by trunk connections 12, 13, 14, 23, 24, 34. In this diagrammatic representation there are four second tier rings, 21, 32, 41 and 43, each of which comprises a number of second level nodes 211 to 214; 321 to 324; 411 to 415; and 431 to 434 respectively, and are connected to the first level network at two of the first level nodes 1, 2, 3, 4. There are four third tier rings 5, 6, 7, 8. The ring 5, comprising nodes 51, 52, 53 is connected to the second tier at second tier nodes 211/212 of second tier ring 21. The ring 6 comprising nodes 61, 62, 63 is connected to the second tier at second tier nodes 322/431. Note that these second tier nodes 322/431 form parts of two separate second tier rings 32, 43 respectively. A third tier ring 7, comprising nodes 71, 72, 73 is connected to the second tier ring 41 at nodes 414 and 415 and a third tier ring 8, comprising nodes 81, 82, 83 and 84, is also connected to the second tier ring 41 at nodes 413 and 414. In practice each of the second tier nodes would have at least one third tier ring connected to it, but only four third tier rings 5, 6, 7, 8 have been shown for clarity.

The nodes are formed from add-drop multiplexers and cross-connects which have associated multiplexers. Add-drop multiplexers are used where it is required to add or extract a 2 Mbit/s signal. In the third tier, the transmission rate is 155 Mbit/s, in the second tier, the transmission rate is 622 Mbit/s, and this rate or a higher rate may be used in the first tier.

FIG. 2 shows a diagrammatic representation of the STM-1 module, and the possible ways in which it can be subdivided to carry a number of VC12, VC2, VC3 and VC4 virtual containers. VC11's are not represented in this diagram. According to the capacity required by the user, for each of the links in the path that the call takes through the network, a virtual container of a suitable size is allocated to that call. The STM-1 has a capacity for sixty-three VC12 slots (or eighty-four VC11 slots), twenty-one VC2 slots, three VC3 slots or a single VC4 slot; and, as will be described below combinations of different types of VCs are also possible. In addition the STM-1 module carries a signalling overhead S.

Capacity on each link in a path is represented by one or more STM-1 modules, the call traffic being transferred between virtual containers at each node. When the capacity is allocated on a particular path a virtual container of the appropriate size is allocated to that call. The containers are allocated such that the remaining capacity has maximum versatility. For example if the first two VC12 slots have already been allocated, a request for a further VC12 slot will be met by allocating slot VC12-3. This leaves all the VC2 slots except the first one free for use, should a VC2 slot be required. Similarly, if the first five VC12 slots and the third and fourth VC2 slots have all been allocated, a request for a further VC12 slot will be met by filling the sixth VC12 slot, thereby leaving as many VC2 and VC3 slots available as possible. This pattern of allocating slots ensures that, for example, a request for a VC3 capacity can be met even if the STM-1 already has allocated up to forty-two VC12's or fourteen VC2's or some combination of the two types, e.g. twenty-seven VC12's and five VC2's.

Figure 3:
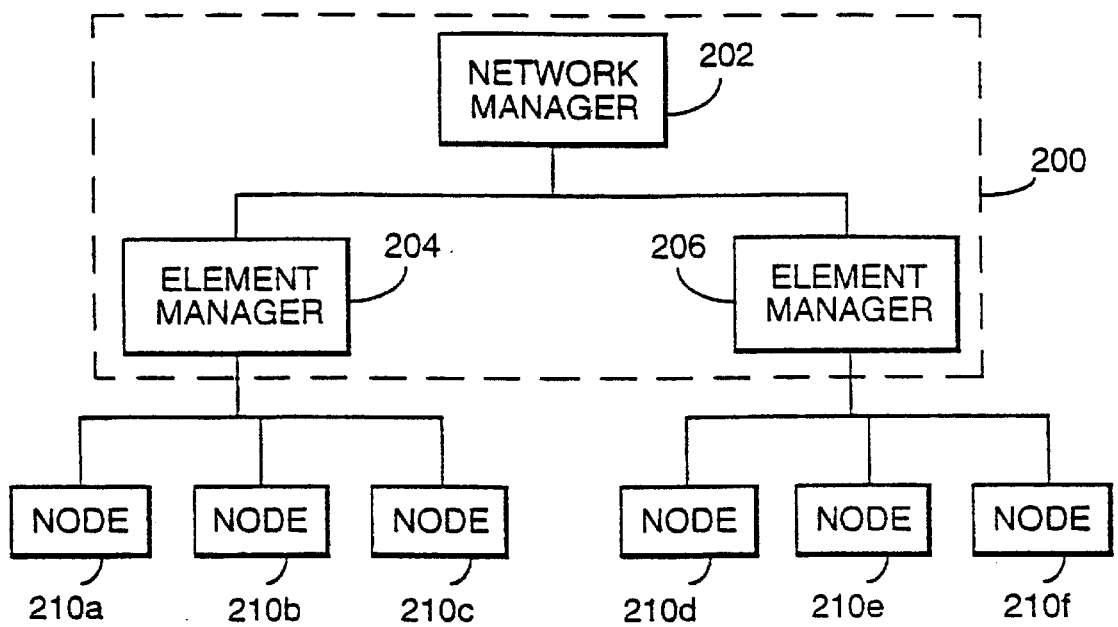
FIG. 3 shows a network management system for controlling the network of FIG. 1.

Referring now to FIG. 3, there is shown part of a network management system 200 for managing the SDH network 91 shown in FIG. 1. The network management system comprises a network manager 202 and a set of element managers for managing the nodes. For reasons of simplicity only two element managers 204, 206 and six nodes 210a, 210b, 210c, 210d, 210e, 210f are shown. The construction of network managers and element managers is generally known to those skilled in the art.

Figure 4:
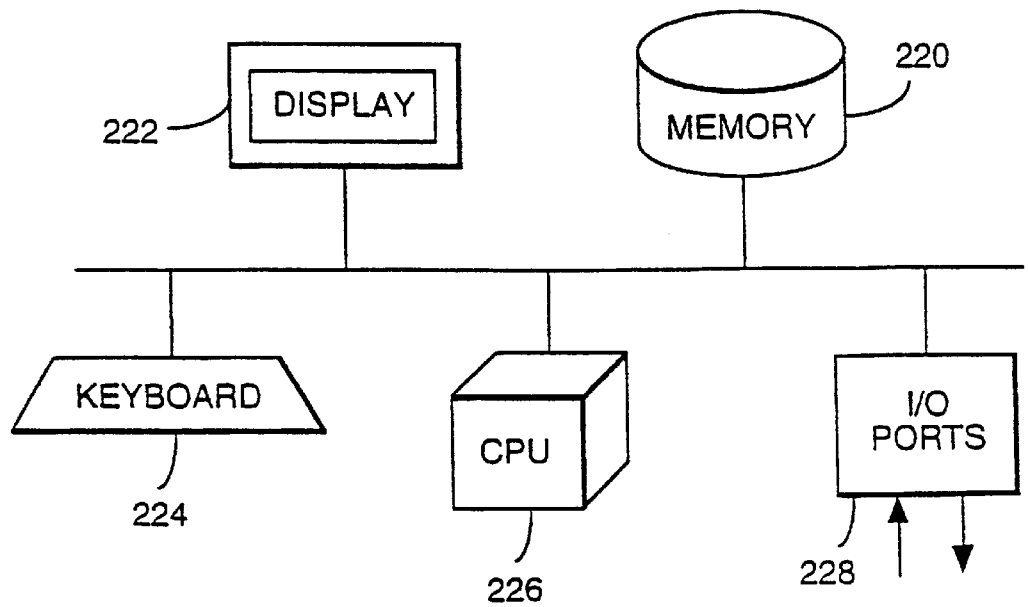
FIG. 4 shows the general construction of a computer suitable for operation of the network management system of FIG. 3.

The network manager 202 and the element managers 204, 206 are each implemented as a computer. The general construction of a suitable computer is shown in FIG. 4. This computer comprises a memory 220, a display device 222, a keyboard 224, a central processing device (CPU) 226, and input/output ports 228. The memory 220 may be implemented as a combination of a hard disk, Random Access Memory (RAM) and Read-Only Memory (ROM). The programs for operating the computer are stored in the memory 220.

Figure 5:
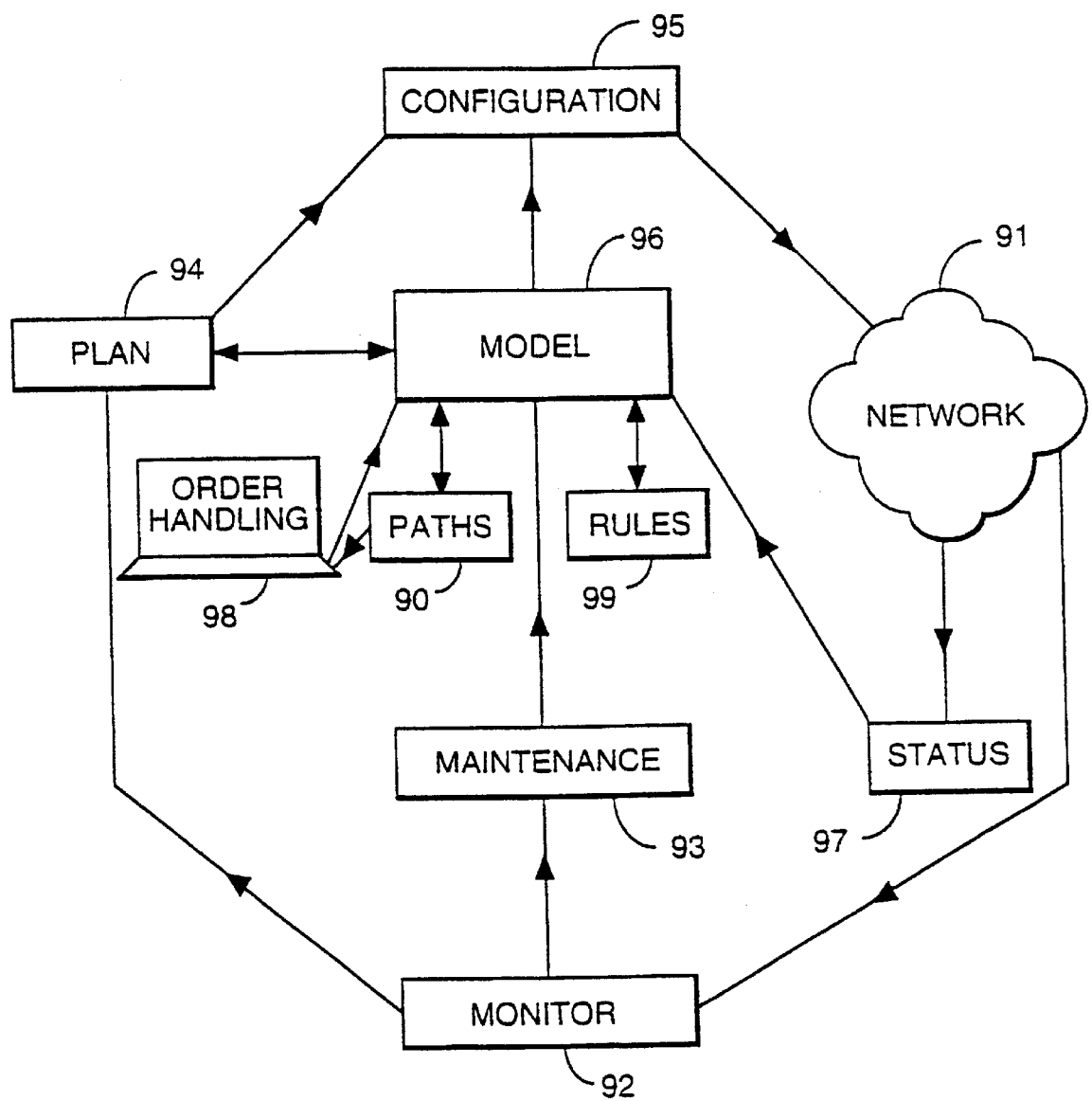
FIG. 5 is a diagrammatic representation of the functional components of a network management system for the network of FIG. 1 and which embodies this invention.

Referring now to FIG. 5, there are shown the functional components of the network management system 200. The functional components are implemented by the programs of the computers which form the network management system. These functional components will now be described. The network 91 that is controlled by the network management system 200 supplies data to a monitoring component 92 which monitors the network to ensure its correct operation. In the event of malfunctions or incipient overloads, instructions are transmitted from the monitoring component 92 to a maintenance component 93 and/or a forward planning component 94 as appropriate. These two components are responsible respectively for rectifying faults in the existing system, and devising enhancements to the system to deal with future demand. The maintenance system interacts with maintenance staff to issue instructions to prepare the system. The planning system generates instructions for a configuration component 95 which, either automatically or by way of instructions to technical staff, causes the network to be modified to meet the planned changes. This process is therefore interactive, changes planned by the planning component 94 being carried out by the configuration component 95, and the effects of such changes on the network 91 being monitored by the monitoring component 92 in order to determine the future planning requirements.

In order to support this function, and to control the order handling process, a network model 96 (embodied in software) interacts with the network 91, monitoring component 92, maintenance component 93, planning component 94, and the configuration component 95. The current status of the network, in terms of connections in service and available capacity on those connections is monitored by a status monitoring component 97. This provides information to allow the capacity currently available in the network and available at any future time, to be modelled in the network model 96. Similarly, any planned maintenance can be programmed into the model, so that capacity which is currently out of service, or projected to be so, can be modelled as becoming available at the projected completion time of the maintenance planned. The planning component 94 has a two-way interaction with the model 96. Firstly, the planning component 94 informs the model 96 of any projected upgrades to the network, again to allow the model 96 to allocate capacity which is projected to have become available by the time that the capacity is required. The model is also used by the planning component 94 in order to carry out its planning function. The configuration component 95 draws on the information contained in the model 96 in order to plan how to modify the network 91, thereby ensuring that the model 96 remains a faithful reproduction of the network 91. The order handling component 98 provides requests for capacity to the system. The order handling is processed within the model 96, and the capacity requirement is met by identifying suitable paths from information held in a store 90 associated with the model 96, or by following the rules obtained from the rule store 99 to identify new paths to add to the store 90, and then configuring the model 96 accordingly. The results of this process are fed to the configuration instruction component 95 which issues instructions to configure the network 91 to meet the capacity at the required time. The status of the network is monitored by the status monitoring component 97, which in turn updates the model 96 thereby ensuring that the model 96 remains a faithful reproduction of the network 91. In this way the system can check whether the configuration function has carried the instructions out correctly.

By using a model of the network which is continuously updated by data obtained from the network the order handling process can make maximum use of the available resources, without attempting to allocate resources which are out of service or already allocated.

Figure 6:
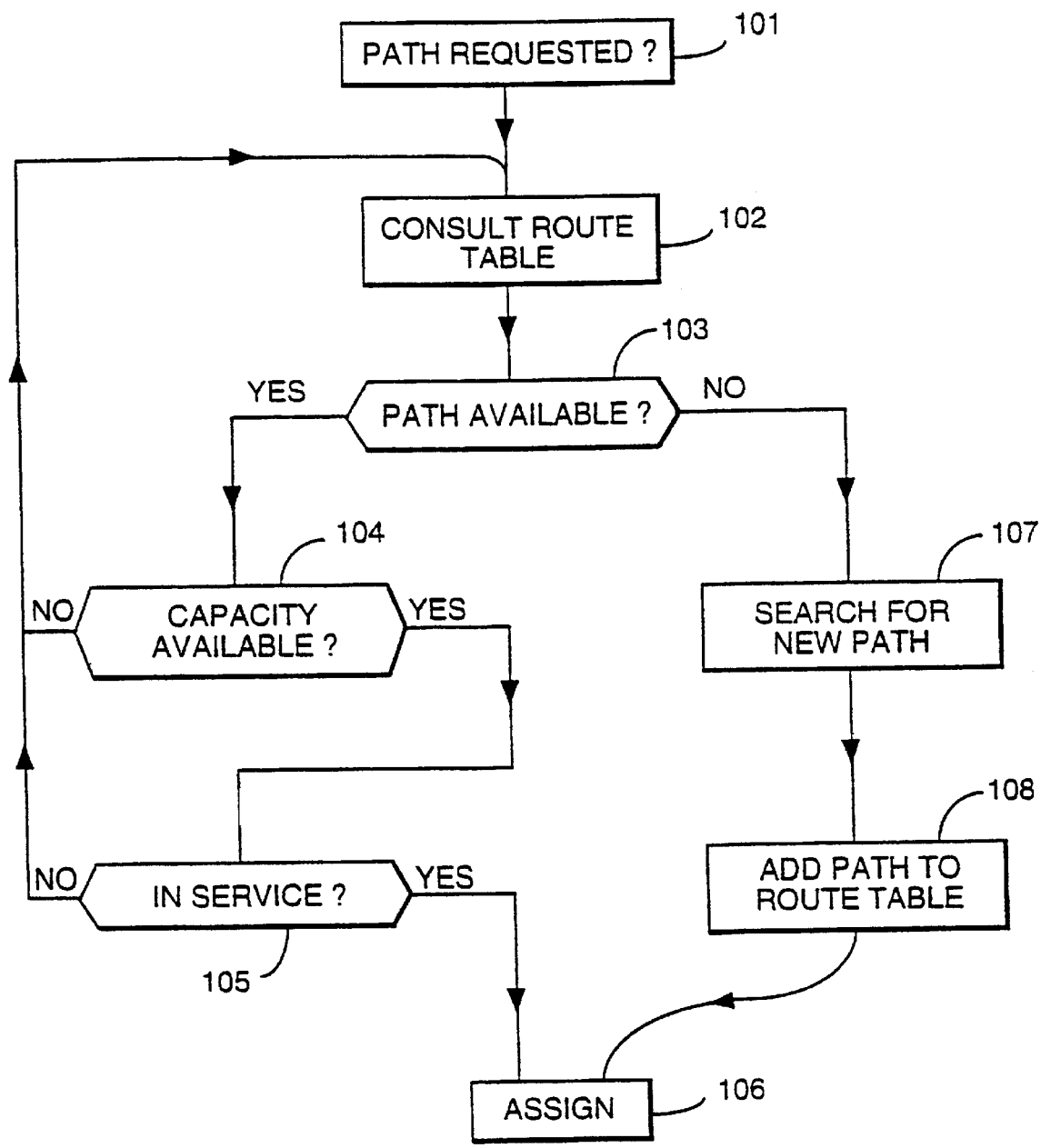
FIG. 6 is a flow chart for the process of the invention.

FIG. 6 shows a flow chart illustrating the order handling process as performed by the order handling component 98 and model 96, with reference to the rule store 99 and path store 90. Initially a request for a path between two network termination points (nodes) is received (step 101). The first function performed by the order handling component 98 is to consult the path store 90 (step 102). This path store 90 has information concerning a number of paths between nodes, which are either in common use or have been found by means of the search procedure to be discussed below. In the next step 103, the availability of such a path is determined. if such a path is available the procedure moves to a further step 104 where the capacity available on that path is assessed. If there is an available path with adequate capacity the process moves to a further step 105 in which the availability of the path is checked, to ensure that the path is still available and has not been removed, e.g. as a result of a failure or routine maintenance. If the path store 90 has an available path with adequate capacity and which is still in service then that path is assigned to the requested user.

In the event that either step 104 identifies that insufficient capacity is available on the identified path, or it is found that the path that has been identified is no longer available (step 105) then the system returns to step 102 to consult the path store 90 in order to identify if an alternative path is available. This process is repeated until either a suitable available path is identified, or until all suitable paths between the two terminations have been tried. When the step of identifying whether a path is available (step 103) fails to find such a path, (which may be at the first iteration if the end-to-end path is unusual or heavily loaded) the process diverts to a path-search process 107. This process will be described in further detail below. Having identified a new path, this path is then added to the path store 90 (step 108), and assigned to the user. Future requests for traffic over the new path will then be offered the new path when the path store 90 is consulted in step 102, provided that the path is still available and capacity is available at the time required. Note that at the time that the user whose request generated that path requires it, the full capacity of the path will not be available. However, except in extreme cases, there will still be some capacity available.

When a path is requested for some future time, the step 105, checking that the path is in service, is repeated at the time that the capacity is actually required. Provided the path is still available, it is assigned in step 106 as described above. If in the interim the path has ceased to be available, for example because an element of the path has been taken out of service either as a result of unplanned maintenance, the process is repeated by again consulting the path store 90 (step 102) and continuing as described above.

Figure 7:
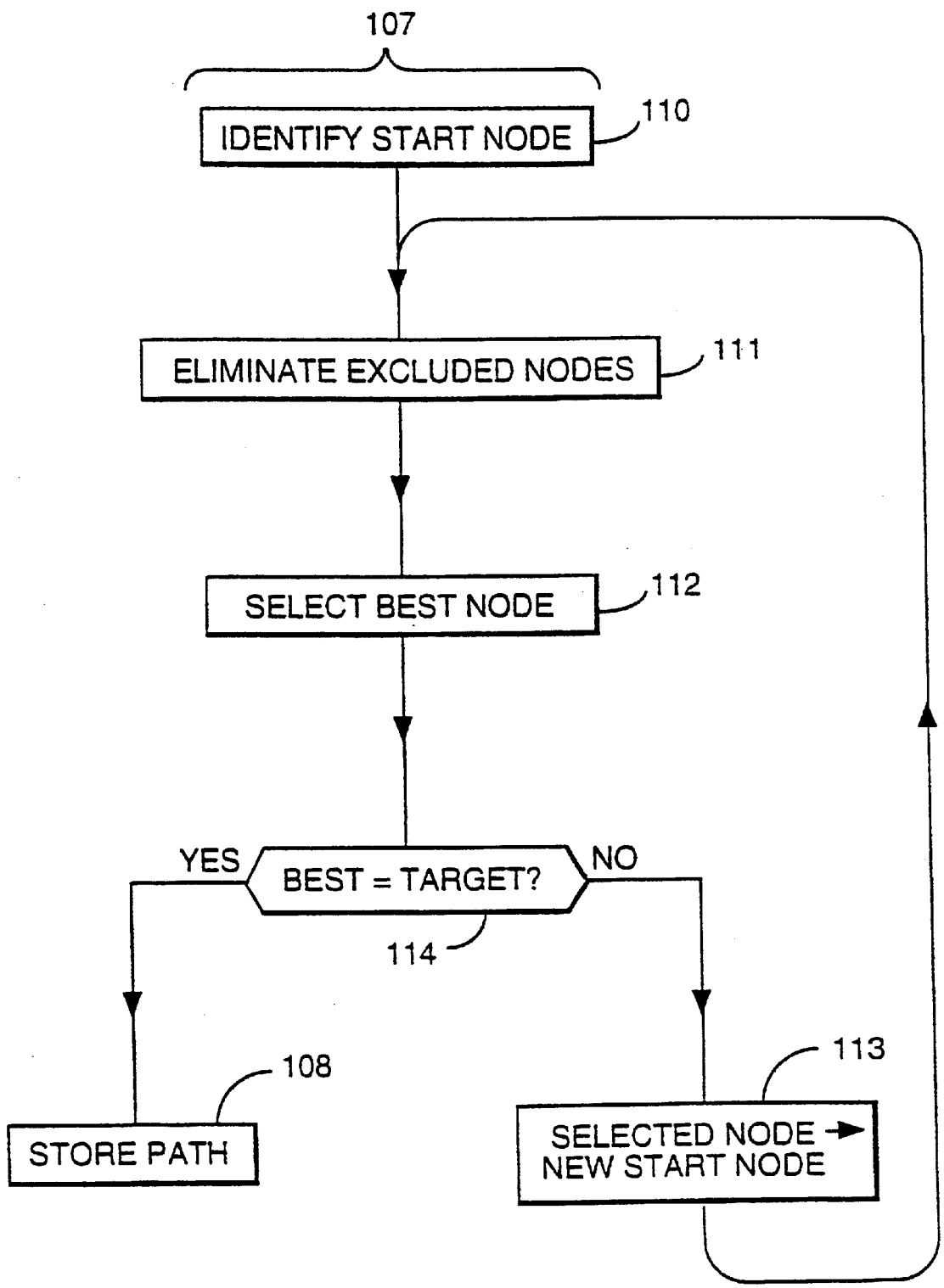
FIG. 7 is a flow chart showing the path-finding part of the process in greater detail.
Figure 8:
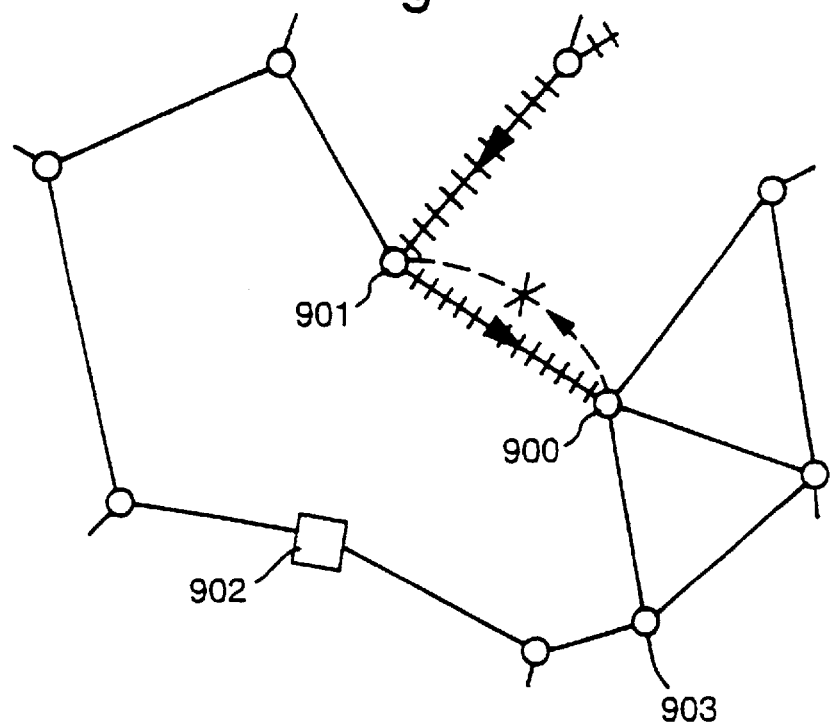
FIGS. 8 and 9 illustrate two 'forbidden' routing elements, FIG. 8 showing a loop, FIG. 9 a dead-end.
Figure 9:
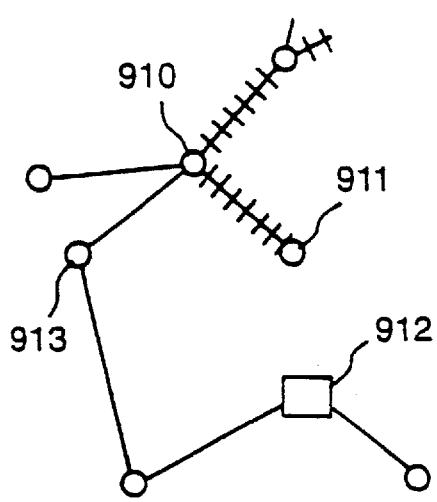
Figure 10A:
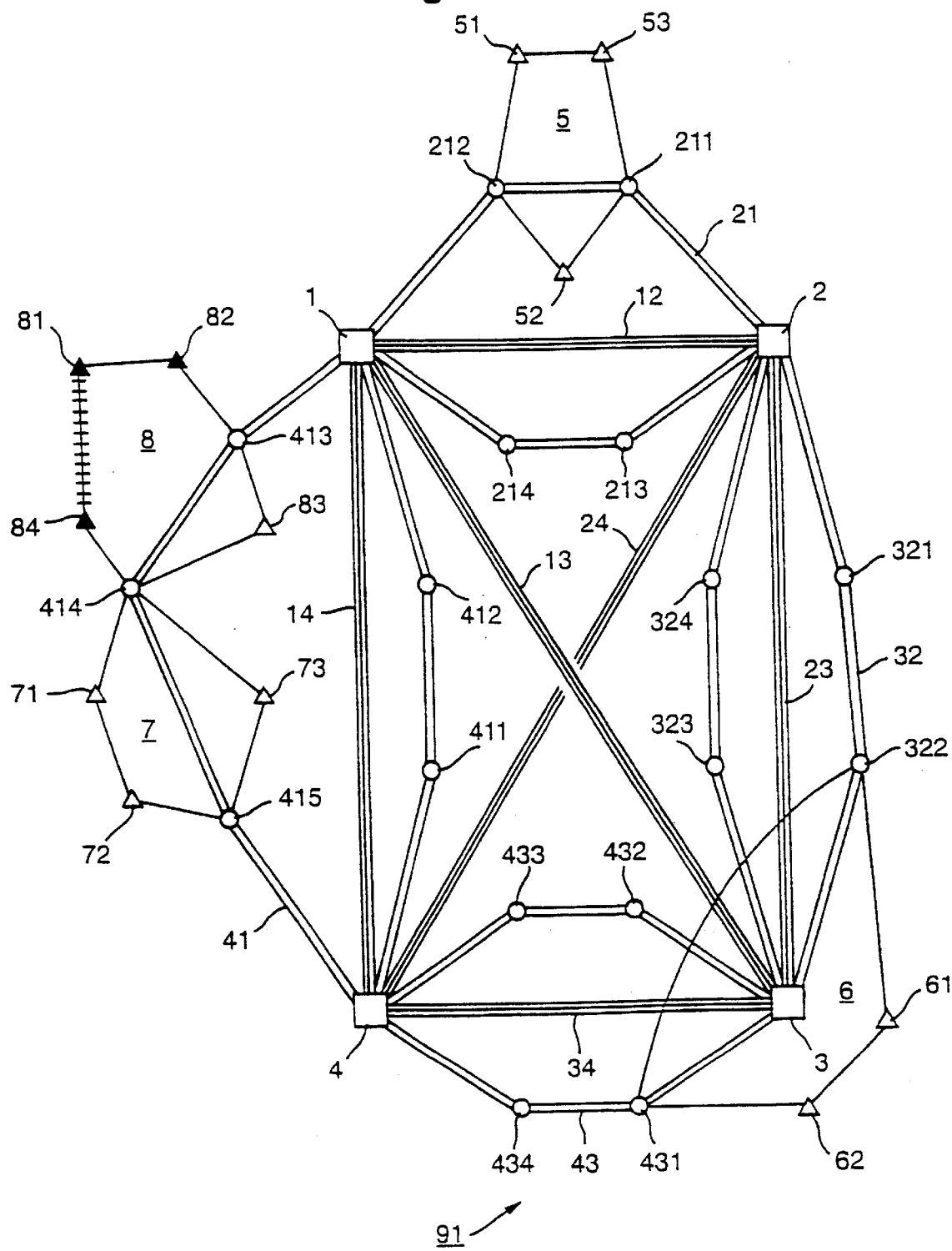
FIGS. 10a to 10g illustrate several steps in constructing a path through the network of FIG. 1.
Figure 10B:
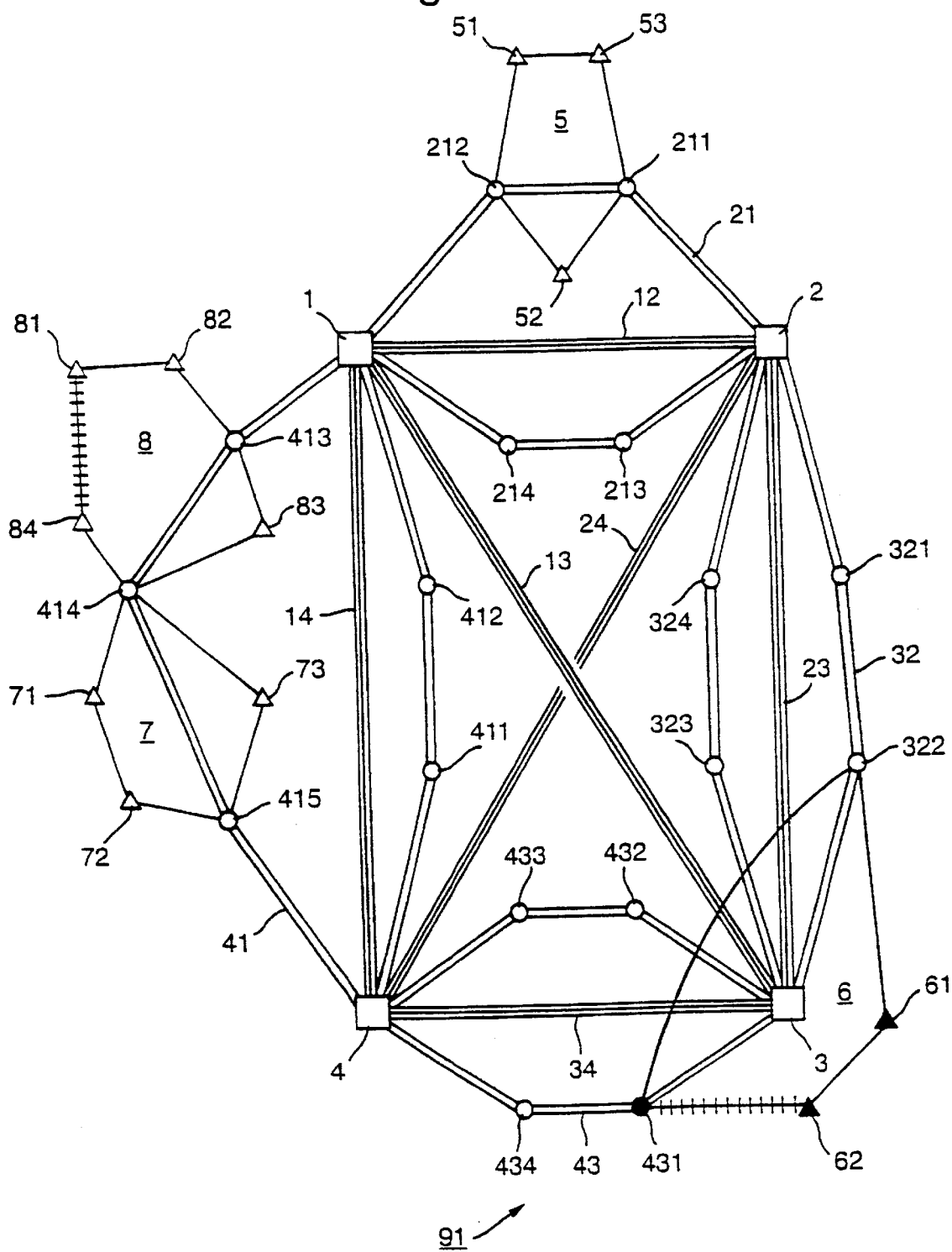
Figure 10C:
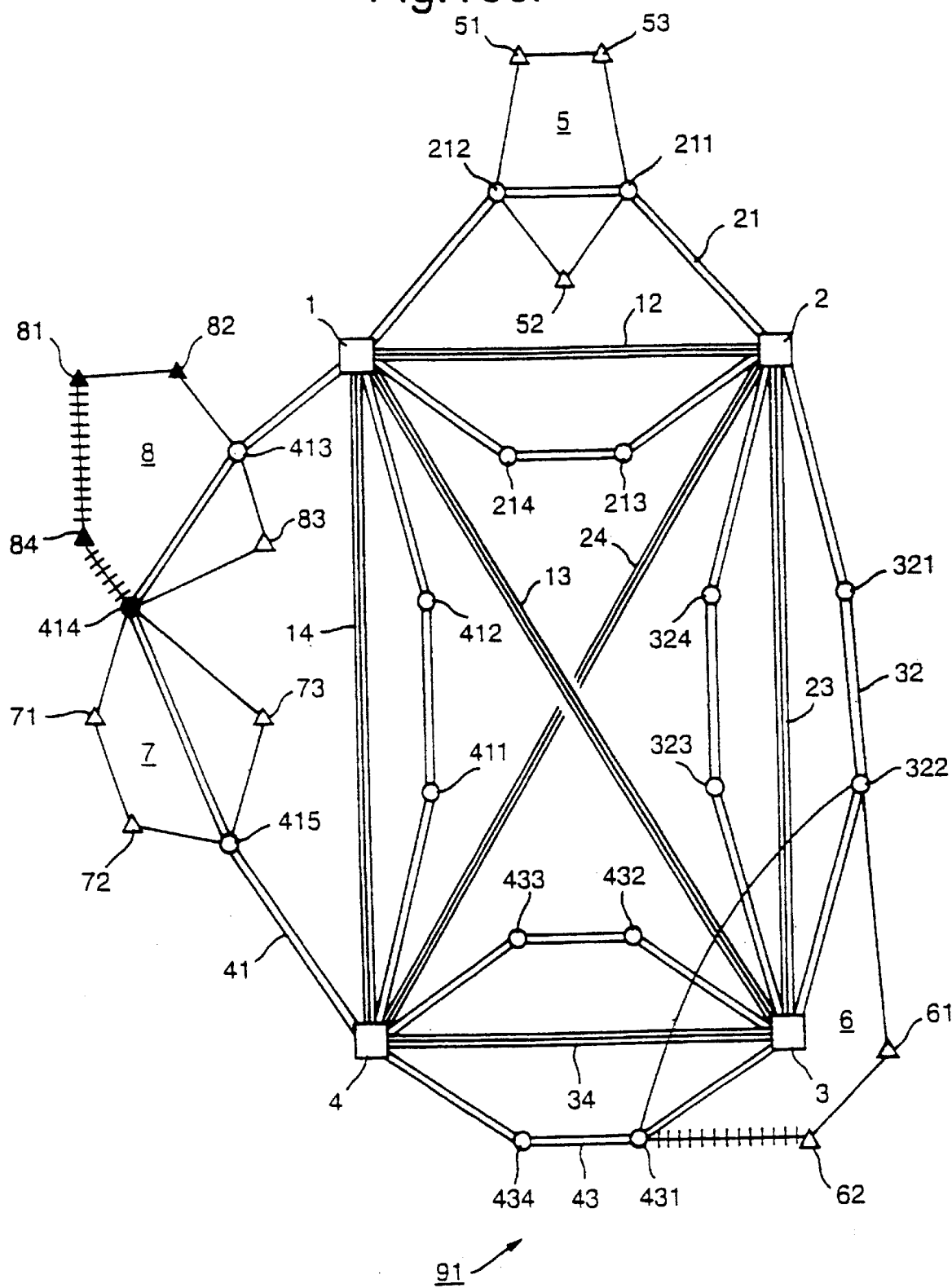
Figure 10D:
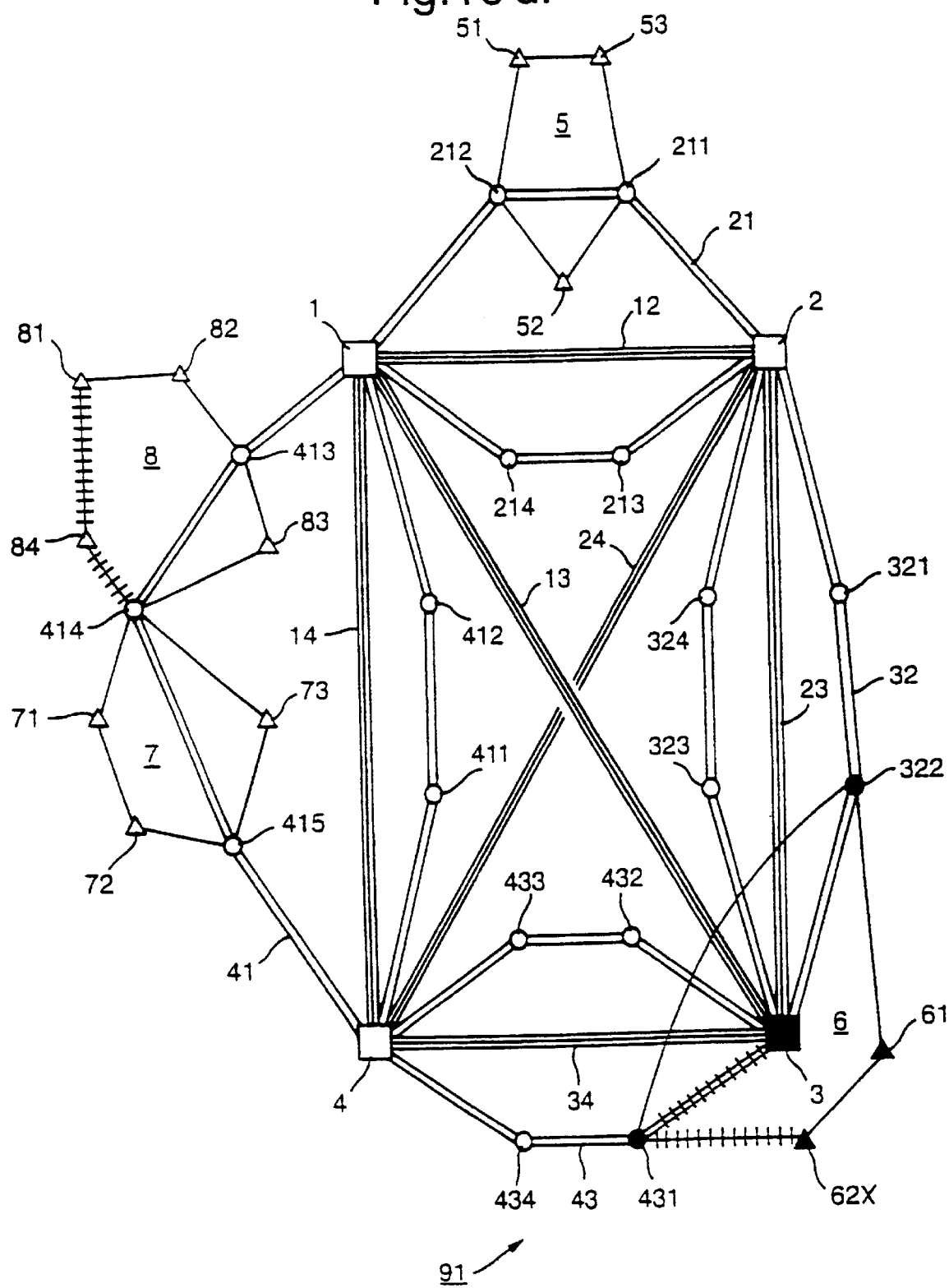
Figure 10E:
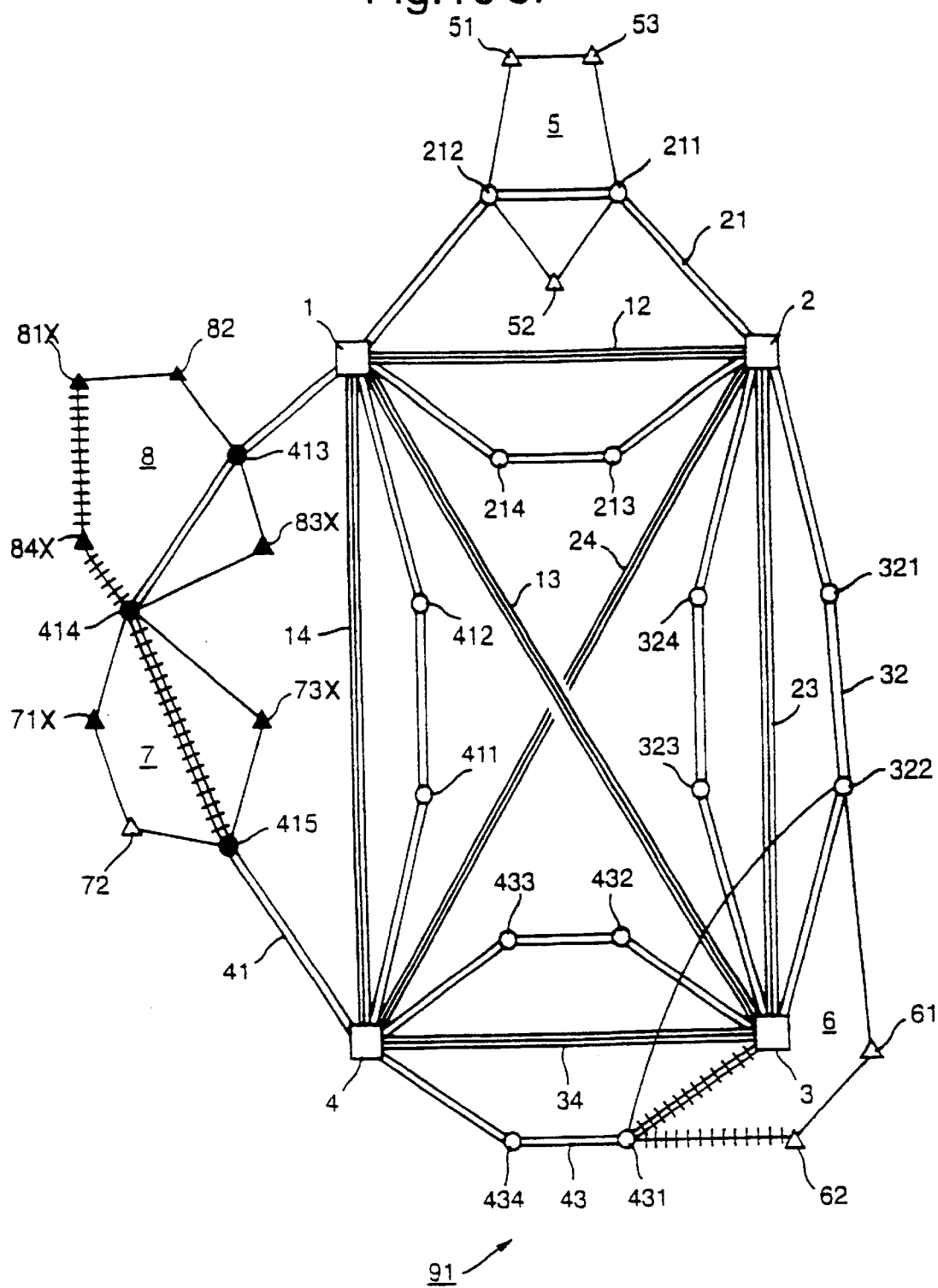
Figure 10:
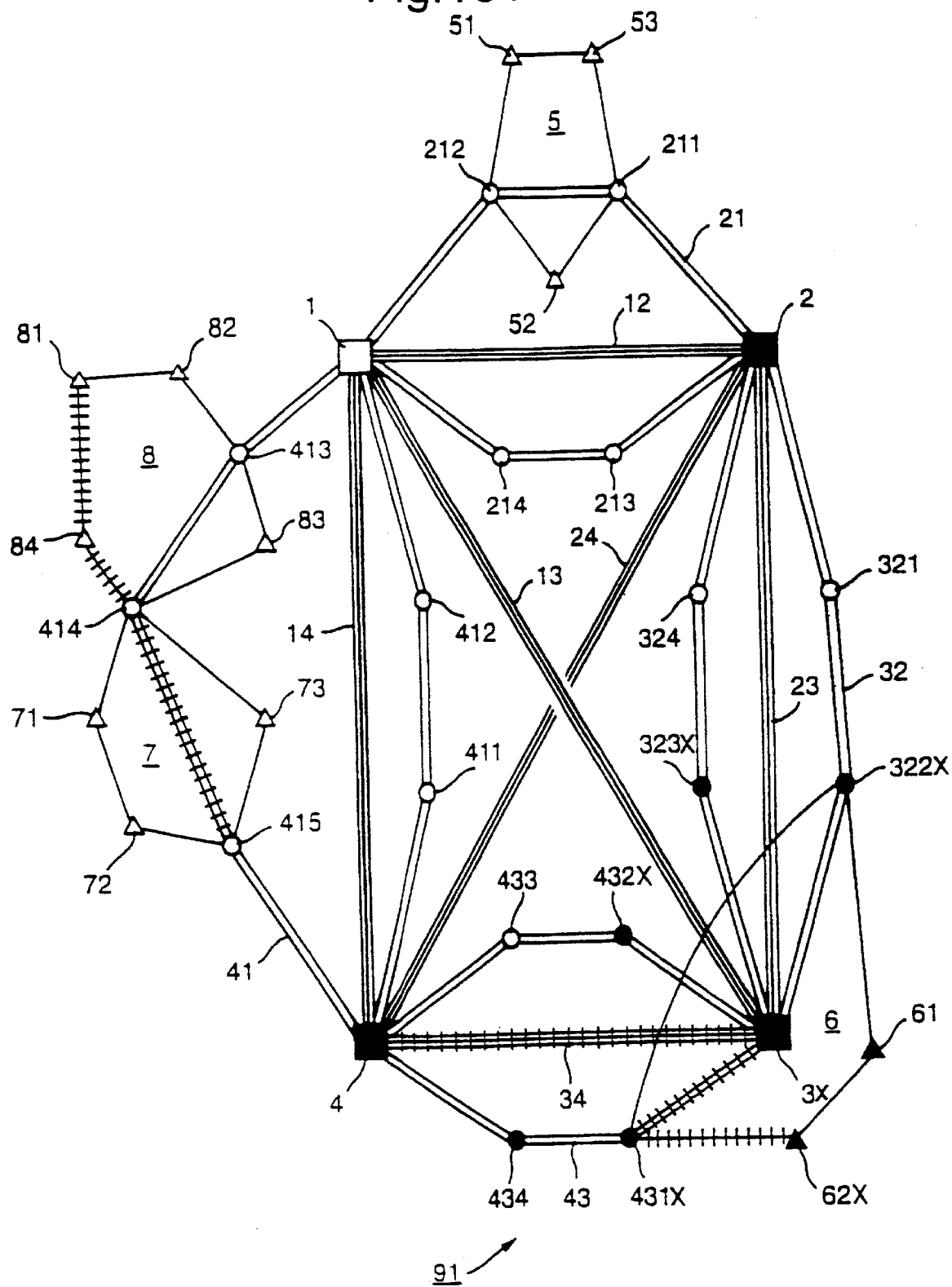
FIGS. 10h to 10j illustrate construction of an alternative path.
FIG. 10k illustrates construction of a third path.
Figure 10G:
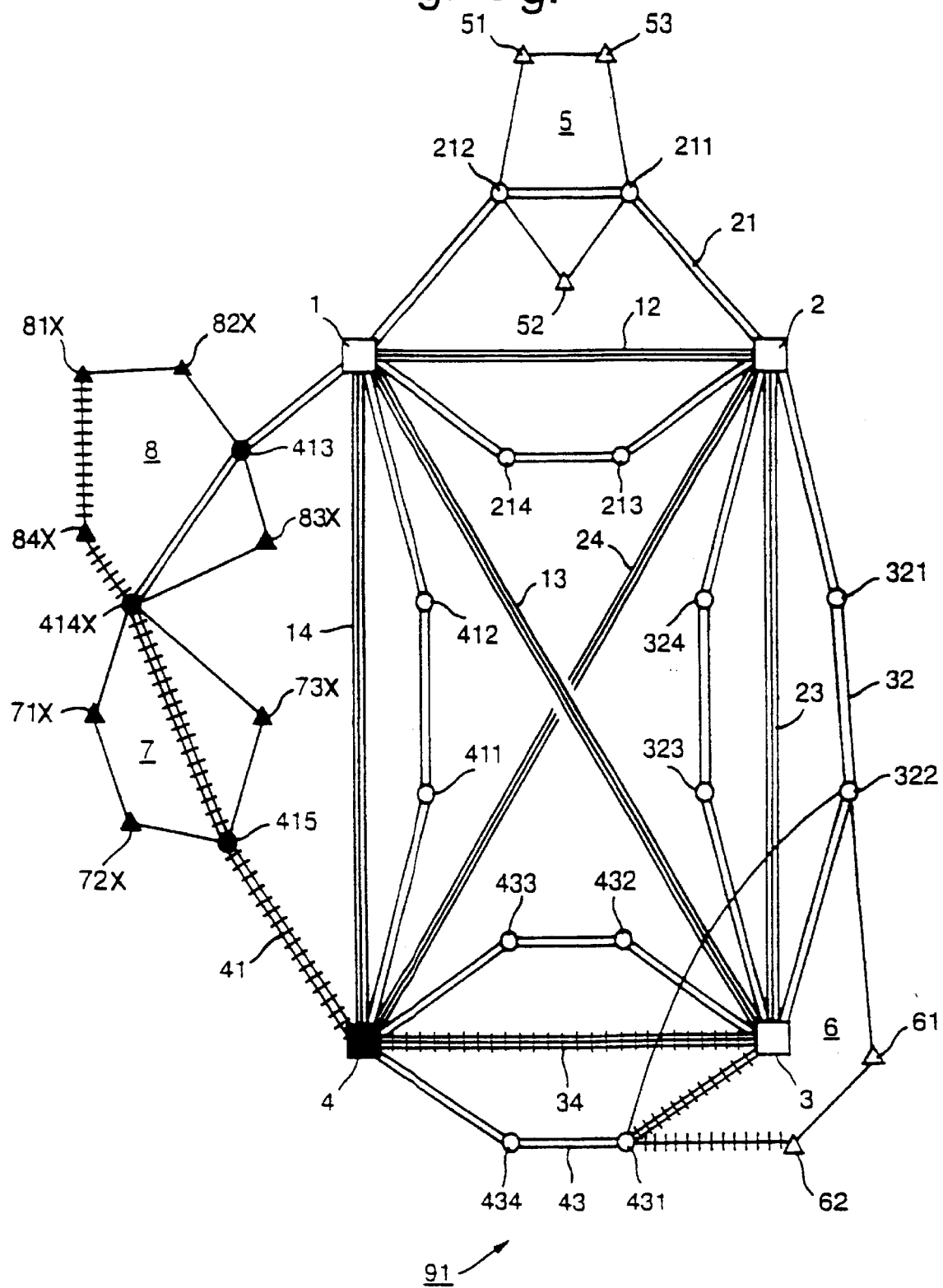
Figure 10:
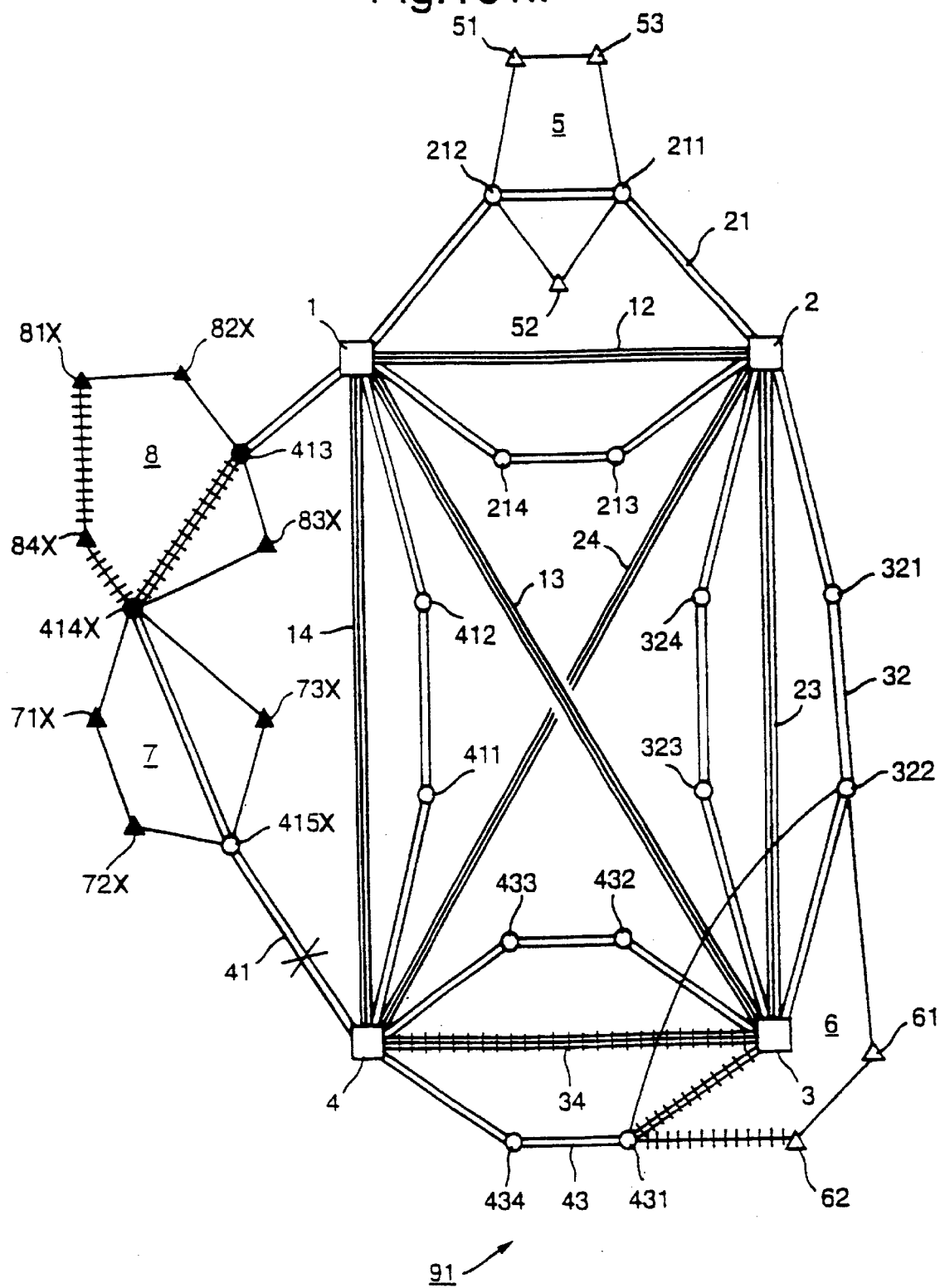
Figure 10I:
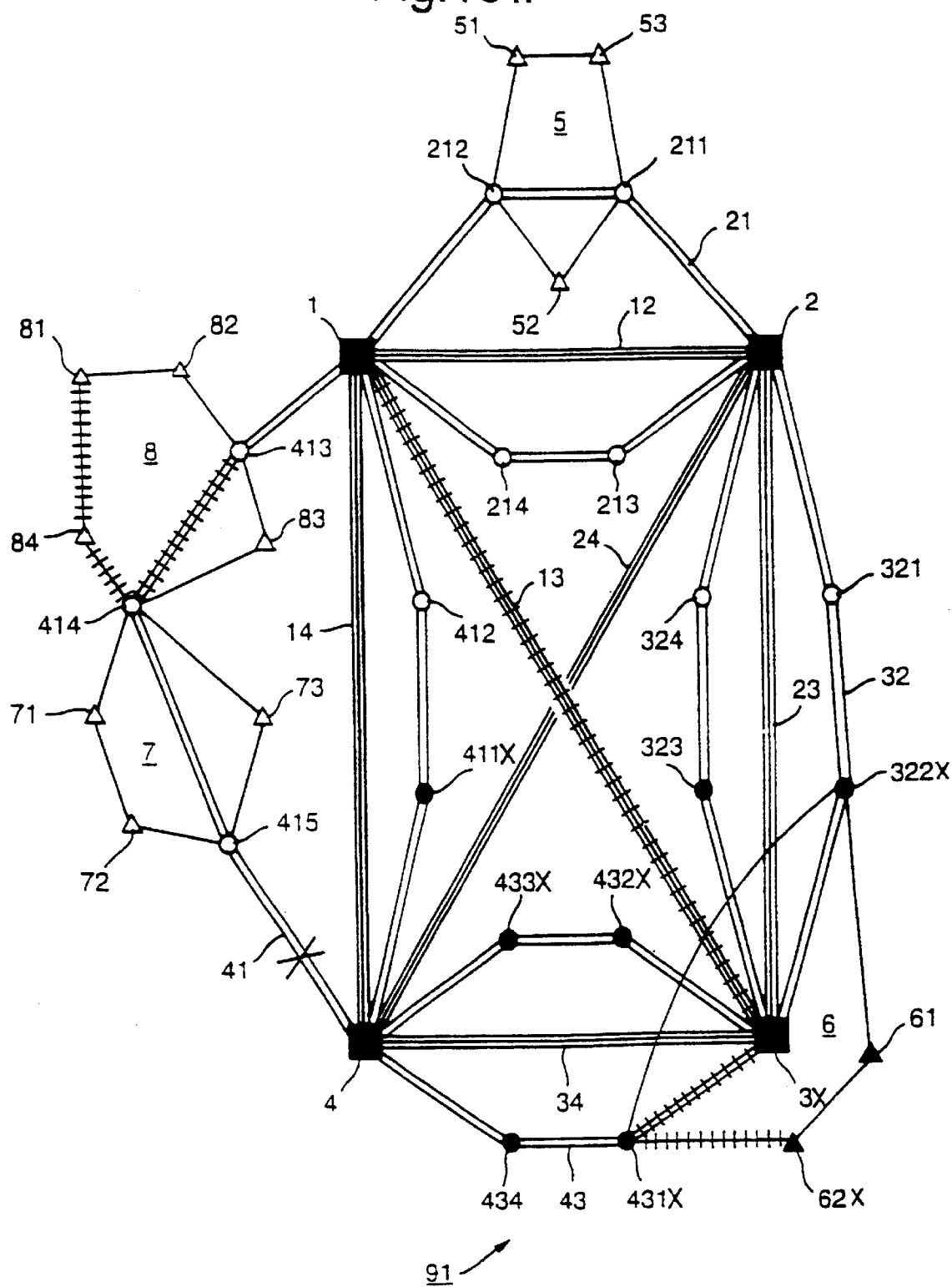
Figure 10J:
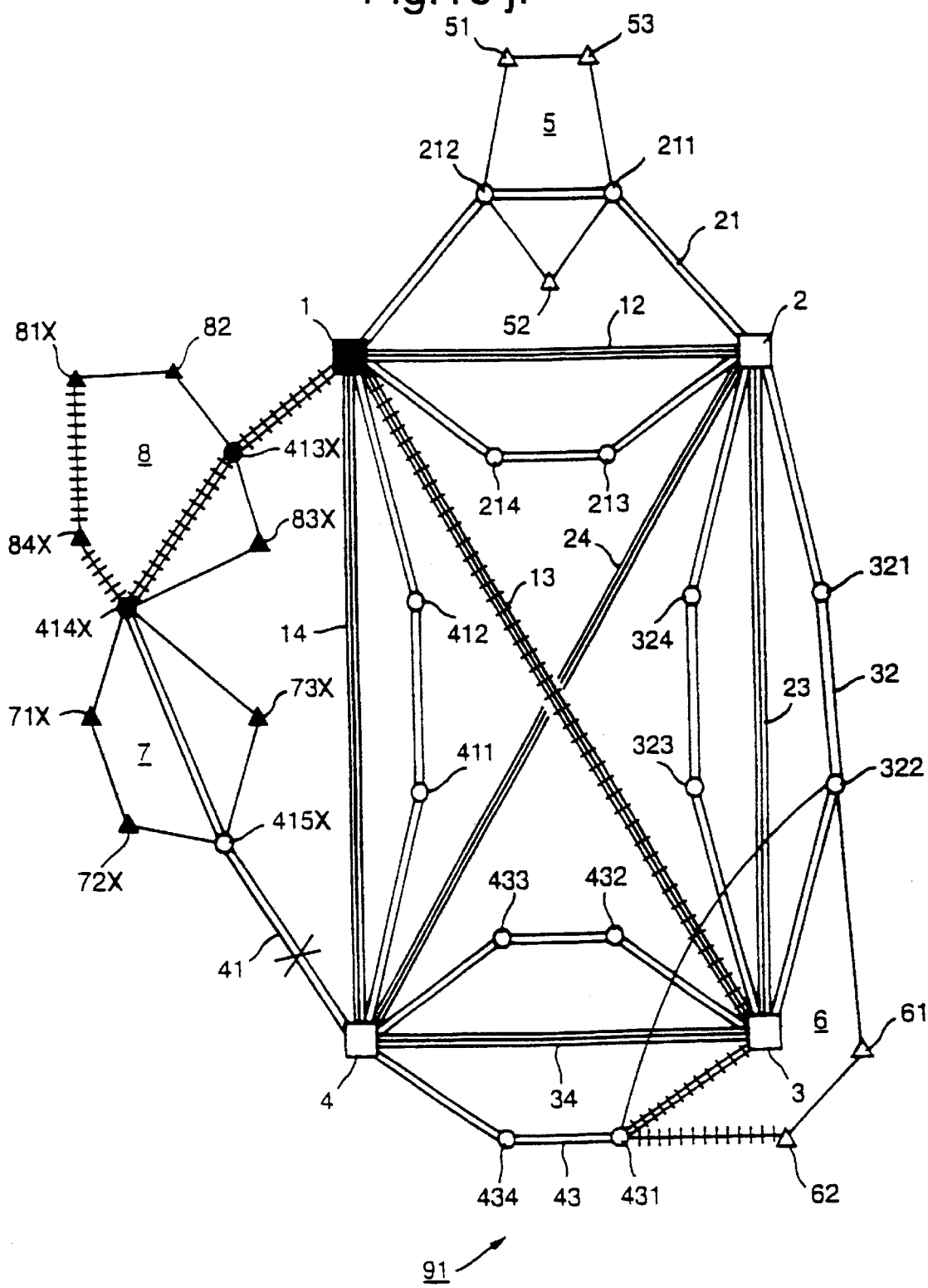
Figure 10K:
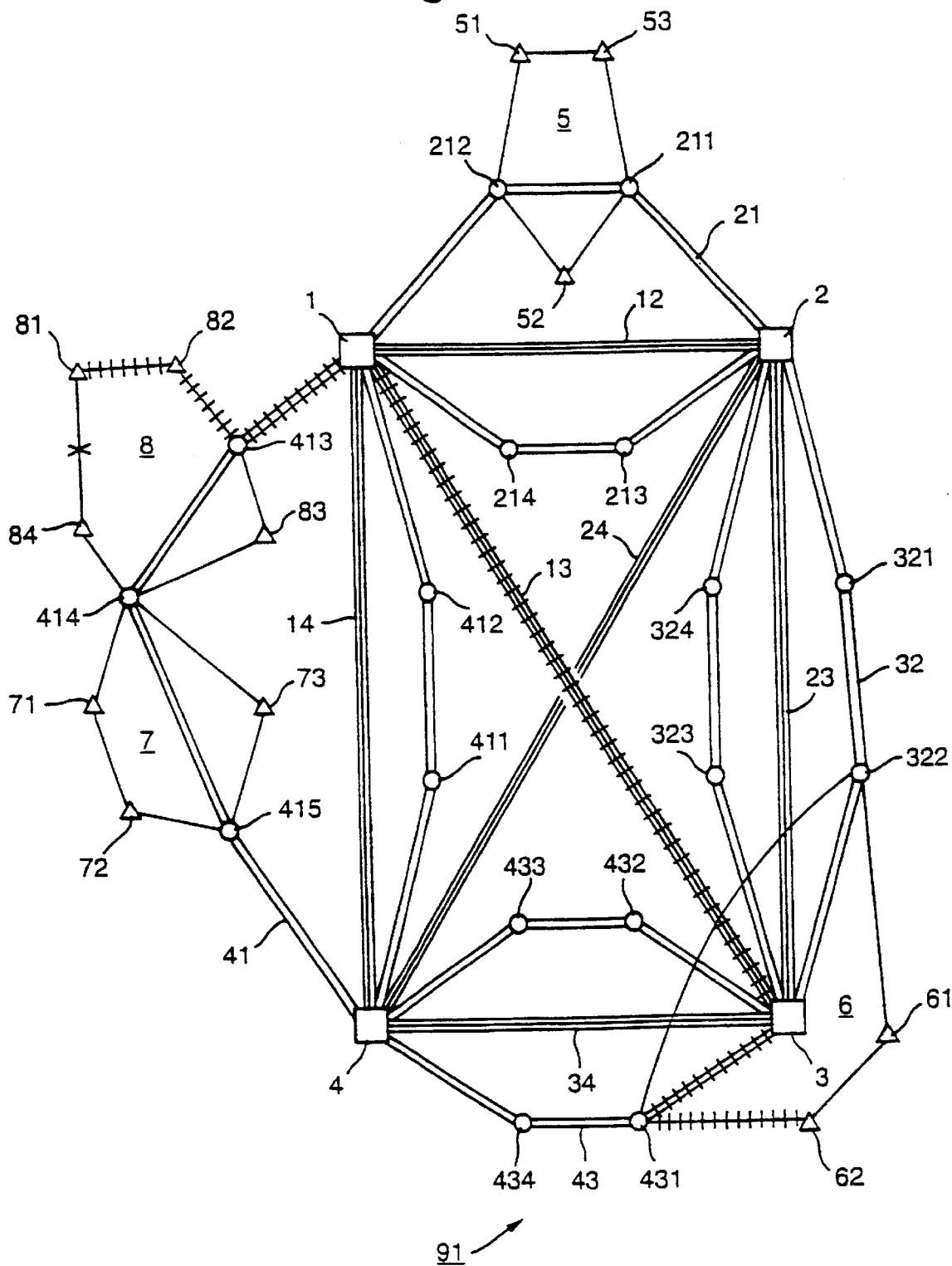

FIG. 7 shows the process of path searching (step 107) in greater detail. FIGS. 8 and 9 illustrate some of the path searching rules used in this process. FIGS. 10*a* to 10*g* show several steps in constructing the path, FIGS. 10*h* to 10*j* showing a second path being constructed, and FIG. 10*k* shows a third path. The elements of the path which have been selected at each stage are shown crossed. Possible new nodes to form the next part of the path are shown in solid blocks those being excluded by the exclusion rule additionally being marked 'X'. All other nodes are shown as open blocks.

In the preferred arrangement used in this example the path is built up as two half paths, starting from each end. The two half paths are built up by adding a link to each alternately, at each step identifying which node, of those already connected to the end point or another point on one existing half path, is closest to the end point of the other half path. The nodes considered in this way at each stage are referred to below as "candidate nodes".

Starting from a given starting node, which will initially be one of the terminations of the path required, all the available paths from that point will be assessed. For example referring to FIG. 1, we identify node 81 as the start point (step 110). The only paths available from that node are to nodes 82 and 84. The first stage in the process is to identify whether either of them is excluded by virtue of the rules contained in the rule store 99 (step 111). The rules used in this example are:

1. No link may be established from a node in one tier to a node in a lower tier.
2. No link may be established from a node in one half path to a node already used in the same half path.
3. If a candidate node is accessible from two or more points on the existing half path, the link from the node closest to the original termination point is selected.

Rule 1 ensures that paths change levels in a systematic way, and in particular that only one part of the path is at the highest tier level. Normally this part will be in the middle of the path, but it may be at one end if one of the end nodes is at this high level. In that case the exclusion rule will result in the path being up as a single "half path" from the lower end. Each half path may include level portions (links between nodes at the same level).

Rule 2 ensures that the path does not loop back on itself. This rule is illustrated in FIGS. 8 and 9.

Rule 3 ensures that the total number of links is not greater than necessary.

FIGS. 8 and 9 illustrate in simplified terms Exclusion Rule 2 described above. In the first case (FIG. 8), a node 901 has been identified as being the closest from the current start node 900 to the target 902, but is not permitted as it already forms part of the path; selecting it would form a closed loop which clearly cannot form part of an optimum path. In FIG. 9 node 911 is the closest to the target 912 but has no available node adjacent to it. This is in fact a special case of the previous example, because the only available link to the proposed node 911 is the immediately preceding node 910, which already forms part of the path. In the cases illustrated in both FIGS. 8 and 9 the node (901, 911 respectively) is to be excluded from consideration, and another branch (903, 913 respectively) will be selected instead.

A node can be excluded by substituting, in the database for its actual distance from the target node, a very large 'exclusion' value $W_{exc}$. This value could be infinite, but in practice it is preferable to use a large non-infinite number.

The exclusion rules may be over-ridden manually if necessary. For example, if a high-level link has failed, it may be necessary to link two high-tier nodes by a lower level link as a temporary expedient.

Of those nodes which are not excluded, the best node for approaching the target (destination) is then selected (step 112). The best node is determined as that for which a weighted value of the distance to the target is a minimum. The weighting is a function of the distance to the target, and of a characteristic tier size. This function ensures that trunk connections are preferred for long distances. In particular, it may be efficient to use a nearby trunk node, even if it is further away from the target than the current start node. A suitable weighted function is determined by the formula $$W_n = d \cdot 2^{\left(\frac{f \cdot d}{d_n}\right)} \text{ subject to } W_n < W_{max}$$

where
$w_n$ is the weighted distance in tier n.
d is the actual distance
f is a factor set to control the contribution of the exponential function to the weight
$d_n$ is a characteristic distance appropriate for tier n.
The value $d/d_n$ is the number of links of size $d_n$ which would be needed to cover the distance d.
$W_{max}$ is a maximum weighted distance, set to be less than $W_{exc}$. This ensures that excluded links (whose distance is $W_{exc}$) are not selected in preference to merely very unsuitable ones (whose distance cannot exceed $W_{max}$). Typically $W_{max}=10^{15}$ and $W_{exc}=10^{16}$.

It will be seen that, for values of d which are small in relation to $d_n$, the equation reduces to $W_n=d$. For $d=d_n$ it becomes $W_n=d.2^f$. For large d it increases exponentially.

The following table gives some values for $W_n$, using f=½, $d_1=200$, $d_2=50$, $d_3=10$.

| d | $d_3 = 10$ | $d_2 = 50$ | $d_1 = 200$ |
|---|---|---|---|
| 0 | 0 | 0 | 0 |
| 1 | 1 | 1 | 1 |
| 5 | 6 | 5 | 5 |
| 10 (= $d_3$) | 14 | 10 | 10 |
| 30 | 85 | 37 | 32 |
| 50 (= $d_2$) | 283 | 71 | 55 |
| 100 | 3200 | 200 | 119 |
| 200 (= $d_1$) | $2 \times 10^5$ | 800 | 283 |
| 500 | $1.6 \times 10^{10}$ | 16000 | 1090 |

It will be seen that the weighting works in favour of higher tiers when distances are large.

In the example, with reference to FIG. 1, if the target node is node 62 then it can be seen that, of the two nodes 82, 84 connected to node 81, both are at the same level (the third tier) but the node 84 is the nearer to the target 62. Therefore it is the node 84 which will be selected (FIG. 10a). This process can then be repeated, using the selected node 84 as the new start node (step 113) as many times as necessary until the target node is reached (step 114).

In the preferred arrangement used in this example the path is built up as two half paths, starting from each end. In the second step, (FIG. 10b) starting from the node 62. there are two possible next nodes, namely node 61 (at the same third level) and 431 (at the next (second) level). Of these, it can be seen that the node 431 is nearer to the new target node 84, and the target is at a distance greater than the size of the second tier 43 so this node will not be weighted against.

At the third iteration (FIG. 10c) the node 84 again has links to only two possible nodes available to it, namely to the third tier node 81 and the second tier node 414. Links from nodes already in the path are also to be considered so the link from the start node 81 to node 82 is also considered. Of the three nodes 81, 82, 414, the node 81 is excluded in step 111 as it already forms part of the path. This leaves nodes 82 and 414 as possible new nodes in the path. Of the two it can be seen that the higher tier node 414 is the nearer to the current target node 431, and the target is at a distance greater than the second tier size.

In the fourth iteration, (FIG. 10d) the possible nodes which can form the next link in the path are, from the current start node 431 to first tier node 3 and second tier nodes, 434 and 322; and from the original start node 62 to node 61. Of these, node 62 is excluded as forming part of the path already and, of the remainder, node 434 is nearest to the current target node 414. However, the current target node 414 is further away than the size of the second tier ring 43, so a weighting will be applied. A link will therefore be established to the higher tier node 3, although it is further from the target 414.

In the fifth iteration (FIG. 10*e*) we proceed from the node 414 found in the third iteration, node 84 (found in the first iteration), and the original start node 81. The nodes linked to these three start nodes are 71, 73, 81, 82, 83, 84, 413 and 415. Nodes 81, 84 are excluded by virtue of forming part of the path already. Nodes 71, 73 and 83 are excluded as they are in a lower tier (the third) than the start node 414.

This leaves third tier node 82 and second tier nodes 413, 415. Of these, node 415 is the closest to the target node 3 and is selected.

In the sixth iteration, (FIG. 10*f*) considering the path from node 3 towards the new target node 415, the nodes having direct links to the existing elements of the path 62, 431, 3, are nodes 2, 4, 434, 322 and 61. Nodes 62, 431 and 3 are excluded as they form part of the path. Nodes 322, 323 and 432 are excluded as they are in a lower tier than the nodes(s) they are connected from. Of those which are not excluded, the closest node to the target is the first tier node 4.

Finally, in the seventh iteration (FIG. 10*g*), a path is sought from the node 415 towards this new target node 4. Of the links to be considered from the nodes 81,84,414, 415 making up the existing path, it can be seen that a direct link is available from node 415 to the current target node 4. Thus the path 81, 84, 414, 415, 4, 3, 431, 62 has been built up.

Having completed a path (step 114), the path is stored in the path store 90 (step 108, FIG. 7). The process can be repeated (from step 110) in order to select different paths. The choice of path or paths to be assigned will be made from those stored in this way, using a selection process to be described later.

Further exclusion rules are necessary to ensure that the system does not simply select the same path each time. This may be done by simply eliminating one link of each previously found path. Elimination of a high-level link will usually result in a very different routing over the trunk network. The lower-level tiers are arranged in rings, so elimination of a low level link will result in a path being searched for in the other direction round the ring. So, for example, eliminating the link between nodes 415 and 4 forces the path search to seek a path from node 414 in the other direction round second-tier ring 41, thus arriving at the top tier at a different point (node 1 instead of node 4). Similarly, elimination of the link between third tier nodes 81 and 84 forces the path search to seek a path from node 81 in the other direction round third-tier ring 8, arriving at the second tier at node 413 instead of node 414.

The number of times the search is done will be determined in advance, in accordance with how important it is to find the optimum path or paths. By monitoring the performance of the system, this number can be modified. For example, it may be reduced if it is found that the best path is usually found in an early cycle.

A maximum number of steps (step count) may be set to avoid very lengthy paths being found, or if in fact all possible paths have already been found. If fewer paths than the set number (or none at all) are found, this is reported as a failure. A manual override may allow the step count to be increased in such circumstances.

In the present example, in order to establish a different path the link between nodes 4 and 415, is now made unavailable. Now, in the seventh iteration of the process described above, the only other available non-excluded node, node 413, is used, and the unused link to node 415 is abandoned. The link from node 414 to node 413 is selected. Since the node 415 is now a 'dead-end', it is labelled as an "excluded" node (FIG. 10*h*), as described above with reference to FIG. 8 and Rule 2.

In the next (eighth) iteration, candidate nodes for the next link are as follows: From the current start point (first tier node 4), both the other first tier nodes 1, 2 are available. They are also available from first tier node 3 which is also in the path. Links from these nodes to second tier nodes 411, 433, 434, 432, 431, 322, 323 are excluded by Rule 1. However, the link to second tier node 434 from second tier node 431, which is in the path, is not excluded by this Rule. The link at third tier level from start node 62 to node 61 is also a candidate. Of these, the first tier node 1 is the closest to the target node 413. The link 13 from node 3 to node 1 is therefore selected. This link is selected in preference to the link 14, from node 4 to node 1, as it requires a smaller total number of links (Rule 3 above). The link 34 is dropped from the path (FIG. 10*i*). It will be seen that at the next (ninth) iteration a half path will have been built up by way of nodes 81, 84, 414, 413 and 1 to link up with the other half path.

It will be seen that the path selected in this example is not quite optimum: a more efficient routing would be by way of node 82 instead of nodes 84 and 414. A further search, this time excluding the first link (81 to 84) would identify this optimum routing (FIG. 10*k*).

The path or paths finally selected will be the most suitable (in most cases the one requiring the fewest links) of those which are found by the process. The exclusion rules may allow some links to be common to more than one path. However, where network diversity is required to ensure that failure of no individual link or node can cause total loss of service, the exclusion rules must require that the paths finally selected from those found in the search must be completely independent of each other. This does not preclude several paths sharing some common links or nodes being identified in the search, but the final selection from those paths for actual allocation to the user must use each link and node (other than the end nodes) only once. The selected paths will be that permitted combination having the lowest total number of links.

This may be modified to preferentially use paths using lower tiers where possible, by applying an additional weighting factor to higher tier nodes when counting the total number of links used. In this way, if two paths have the same number of links, the one using fewer high-tier links will be selected.

Figure 11:
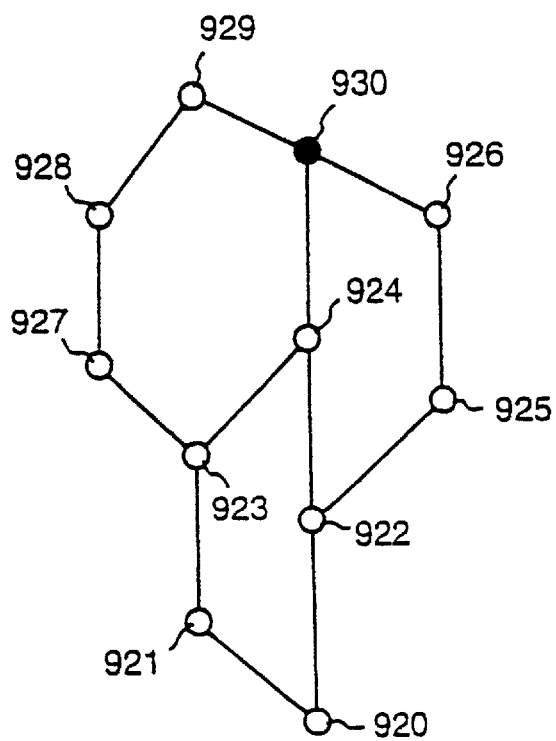
FIG. 11 illustrates a rule for selecting a combination of two distinct paths, to provide path diversity.

The optimum combination may not necessarily include the optimum individual path. For example, in FIG. 11 the optimum individual path from start node 920 to target node 930 is by way of nodes 922 and 924. However, if this path is used, the only other available path is the circuitous path using nodes 921, 923, 927, 928, 929. The optimum combination of paths is for the first path to use nodes 921, 923 and 924, and the second path to use nodes 922, 925 and 926.

What is claimed is:

1. A method of operating a network management system for a telecommunications network in order to satisfy a request for a connection path having a specified capacity between two specified terminations of the network, the network comprising a plurality of connections between network nodes, each connection having a predetermined capacity, the method comprising the steps of searching a store of routings and available capacities to identify a connection path to satisfy the request; determining whether a connection path with adequate capacity is present in the store; if no such path is present in the store, testing a model of the network to identify at least one suitable connection path between the requested terminations, and adding any suitable connection paths so identified to the store, and upon identifying a connection path having the requested capacity between the requested terminations, allocating the identified connections so as to satisfy the request.

2. A method according to claim 1, wherein the store of routings and available capacities is updated in response to connection paths becoming available or unavailable.

3. A method according to claim 1, wherein capacity is allocated in advance, in response to a request, the allocation of individual paths to connections being made at the time for which the path is required.

4. A method according to claim 1, wherein the network testing step is carried out by the following steps:
   identifying a start point and a target point,
   identifying from the nodes in the network directly connected to the start point, that node which is most suitable for approaching to the target point,
   establishing the connection between the start point and the node so identified as the first link in the connection path, and
   repeating the process using the identified node as the new start point, until a connection is made with the target point.

5. A method according to claim 4 wherein the process for identification of a connection path is carried out from both end points generating two half paths, the target point of each half path being redefined at each interaction as the current start point of the other half path.

6. A method according to claim 4, wherein when a node is established as forming part of a connection path, said node is excluded from consideration in any further links in the path.

7. A method as claimed in claim 6, wherein if all nodes connected to the current start node are excluded from consideration, the link connected to the current start node is deleted and the process is repeated from the previous start node.

8. A method as claimed in claim 6, wherein at each stage all nodes connected either to the current start node or any other nodes in the connection path, other than any excluded nodes, are considered as candidates for the next link, and if a node connected to an existing node in the connection path other than the current start node is selected, the links between the existing node and the current start node are deleted from the connection path and the link between the existing node and the new node is added to the connection path.

9. A method as claimed in any of claim 4, wherein the network has a tiered structure, and wherein the most suitable node is defined as that which is closest to the target node, subject to a weighting factor defined so that high level links are used in preference to lower level nodes for long paths.

10. A method according to claim 1, comprising the further step of monitoring the available capacity present in the store, and providing an alert if the available capacity falls below a predetermined minimum.

11. A method according to claim 10, wherein the available capacity is monitored by determining whether the step of testing the model fails to identify a suitable connection path.

12. A network management system for allocating a connection path between two terminations of a telecommunications network, the network comprising a plurality of connections between network nodes, each connection having a predetermined capacity, the apparatus comprising: input means for accepting a request for a connection path; a connection path store for storing data concerning routings and available capacities; means for searching the connection path store to identify a connection path routing to satisfy such requests; means for determining whether such a path is present in the connection path store; search means for testing a model of the network for suitable connection paths, and means for adding suitable paths so identified to the connection path store.

13. A network management system according to claim 12, comprising updating means for updating the connection path store in response to connection paths becoming available or unavailable.

14. A network management system according to claim 12 wherein the search means comprises:
   means for identifying a start point and a target point;
   selection means for selecting, from the nodes in the network directly connected to the start point, that node which is most suitable for approaching the target point;
   means for establishing the connection between the start point and the node so identified as the next link in the connection path;
   means for redefining the start point and/or the target point;
   means for identifying when the next link in the connection path completes the path by linking the current start point with the current target point; and
   means for storing the path so identified in the connection path store.

15. A network management system according to claim 14 wherein the means for redefining the start point and target point redefines the previous start point as the target point and redefines the newly identified node as the start point.

16. A network management system according to claim 14, comprising means for excluding nodes established as forming part of a connection path from selection by the selection means for any further links in the path.

17. A network management system as claimed in claim 16, wherein the selection means are arranged to consider at each stage all nodes connected either to the current start node or any other nodes in the connection path, other than any excluded nodes, and means for deleting from the connection path the links between the existing node and the current start node should a node connected to an existing node in the connection path other than the current start node be selected.

18. A network management system according to claim 14, for use with a network having a tiered structure, wherein the selection means is arranged to select the node closest to the target node subject to a weighting factor defined so that high level links are used in preference to lower level nodes for long paths.

19. A network management system according to claim 12 comprising means for monitoring the available capacity present in the store, and means for providing an alert if the available capacity falls below a predetermined minimum.

20. A network management system according to claim 19, comprising means for determining whether the step of testing the model fails to identify a suitable connection path.

21. A network management system comprising status monitoring means (97) for monitoring the usage of individual elements of the network (91), modelling means (96) controlled by the status monitoring means (97) for storing data relating to the current configuration of the network (91), order handling means (98) for receiving requests for connection paths through the network (91), wherein the modelling means (96) comprises apparatus according to claim 12 for allocating a connection path, and configuration means (95) controlled by the modelling means (96) for controlling the network (91) in response to the requests processed by the modelling means (96).

22. A network management system according to claim 21, further comprising abnormality monitoring means for monitoring the operation of the network (91), processing means (93, 94) controlled by the abnormality monitoring means (92) for processing instructions to reconfigure the network (91) in response to such abnormality conditions.

23. A network management system according to claim 22, wherein the order handling means comprises means for generating requests for connection paths in advance of the time that the connection path is required, and the modelling means comprises means to store data generated by the processing means (93, 94) relating to projected future configurations of the network, and wherein the modelling means (96) allocates capacity in response to advance requests generated by the order handling means (98) according to the configuration for the network (91) projected to be current at the time the capacity is required.

24. A network management system according to claim 21 comprising means for monitoring the available capacity present in the network, and means for providing an alert if the available capacity falls below a predetermined minimum.

25. A network management system according to claim 24, comprising means for determining whether the step of testing the model fails to identify a suitable connection path.

* * * * *